(12) United States Patent
Ardhanari et al.

(10) Patent No.: US 12,182,311 B1
(45) Date of Patent: Dec. 31, 2024

(54) APPARATUS AND A METHOD FOR GENERATING A DICTIONARY DATA FILTER FOR DATA DEIDENTIFICATION

(71) Applicant: nference, Inc., Cambridge, MA (US)

(72) Inventors: Sankar Ardhanari, Andover, MA (US); Karthik Murugadoss, Cambridge, MA (US)

(73) Assignee: nference, Inc., Cambridge, MA (US)

( * ) Notice: Subject to any disclaimer, the term of this patent is extended or adjusted under 35 U.S.C. 154(b) by 0 days.

(21) Appl. No.: 18/744,653

(22) Filed: Jun. 16, 2024

(51) Int. Cl.
  *G06F 21/00* (2013.01)
  *G06F 21/62* (2013.01)
(52) U.S. Cl.
  CPC ................ *G06F 21/6254* (2013.01)
(58) Field of Classification Search
  None
  See application file for complete search history.

(56) References Cited

U.S. PATENT DOCUMENTS

| | | | | |
|---|---|---|---|---|
| 11,113,418 B2 * | 9/2021 | Allen | ............... | G16H 10/60 |
| 11,537,748 B2 * | 12/2022 | Austin | ............... | G06F 21/6254 |
| 2021/0366106 A1 * | 11/2021 | Yao | ............... | G06F 21/6254 |
| 2023/0298764 A1 * | 9/2023 | Mikhno | ............... | G16H 40/67 |
| 2023/0379659 A1 * | 11/2023 | Belt | ............... | H04W 4/025 |
| 2023/0418978 A1 | 12/2023 | Sublett et al. | | |

OTHER PUBLICATIONS

Gardner et al., "An evaluation of feature sets and sampling techniques for de-identification of medical records", IHI '10: Proceedings of the 1st ACM International Health Informatics Symposium, pp. 183-190 (Year: 2010).*

* cited by examiner

*Primary Examiner* — Morshed Mehedi
(74) *Attorney, Agent, or Firm* — Caldwell Intellectual Property Law

(57) ABSTRACT

An apparatus for generating a dictionary data filter for data deidentification is disclosed. The apparatus includes at least processor and a memory communicatively connected to the processor. The memory instructs the processor to receive a plurality of user data. The memory instructs the processor to generate contextual data as a function of the plurality of user data. The memory instructs the processor to identify a plurality of patient identifiers and a plurality of localized terms within the plurality of user data. The memory instructs the processor to generate a dictionary data filter as a function of the plurality of localized terms. The memory instructs the processor to identify one or more misidentified patient identifiers within the plurality of patient identifiers using the dictionary data filter. The memory instructs the processor to modify the plurality of patient identifiers as a function of the one or more misidentified patient identifiers.

20 Claims, 9 Drawing Sheets

APPARATUS AND A METHOD FOR GENERATING A DICTIONARY DATA FILTER FOR DATA DEIDENTIFICATION

FIELD OF THE INVENTION

The present invention generally relates to the field of data management. In particular, the present invention is directed to an apparatus and a method for generating a dictionary data filter for data deidentification.

BACKGROUND

Managing unstructured user data remains a significant challenge, particularly when such data contains terms that vary widely in meaning across different regions, industries, or communities. These terms often lead to inconsistencies in data interpretation, complicating the tasks of data retrieval, analysis, and integration across various systems. Additionally, the growing volume of digital data, coupled with the increasing need for real-time data processing, exacerbates these challenges, demanding more sophisticated methods for data structuring and retrieval.

SUMMARY OF THE DISCLOSURE

In an aspect, an apparatus for generating a dictionary data filter for data deidentification is disclosed. The apparatus includes at least processor and a memory communicatively connected to the processor. The memory instructs the processor to receive a plurality of user data. The memory instructs the processor to generate contextual data as a function of the plurality of user data. The memory instructs the processor to identify a plurality of patient identifiers within the plurality of user data. The memory instructs the processor to identify a plurality of localized terms as a function of the contextual data and the plurality of user data. The memory instructs the processor to generate a dictionary data filter as a function of the plurality of localized terms. The memory instructs the processor to identify one or more misidentified patient identifiers within the plurality of patient identifiers using the dictionary data filter. The memory instructs the processor to modify the plurality of patient identifiers as a function of the one or more misidentified patient identifiers.

In another aspect, a method for generating a dictionary data filter for data deidentification is disclosed. The method includes receiving, using at least a processor, a plurality of user data. The method includes generating, using the at least a processor, contextual data as a function of the plurality of user data. The method includes identifying, using the at least a processor, a plurality of localized terms as a function of the contextual data and the plurality of user data. The method includes identifying, using the at least a processor, a plurality of localized terms within the plurality of user data as a function of the contextual data. The method includes generating, using the at least a processor, a dictionary data filter as a function of the plurality of localized terms. The method includes identifying, using the at least a processor, one or more misidentified patient identifiers within the plurality of patient identifiers using the dictionary data filter. The method includes modifying, using the at least a processor, the plurality of patient identifiers as a function of the one or more misidentified patient identifiers.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the generation and implementation of a dictionary data filter. The apparatus includes at least processor and a memory communicatively connected to the processor. The memory instructs the processor to receive a plurality of user data. The memory instructs the processor to generate contextual data as a function of the plurality of user data. The memory instructs the processor to identify a plurality of patient identifiers within the plurality of user data. The memory instructs the processor to identify a plurality of localized terms as a function of the contextual data and the plurality of user data. The memory instructs the processor to generate a dictionary data filter as a function of the plurality of localized terms. The memory instructs the processor to identify one or more misidentified patient identifiers within the plurality of patient identifiers using the dictionary data filter. The memory instructs the processor to modify the plurality of patient identifiers as a function of the one or more misidentified patient identifiers. Exemplary embodiments illustrating aspects of the present disclosure are described below in the context of several specific examples.

Figure 1:
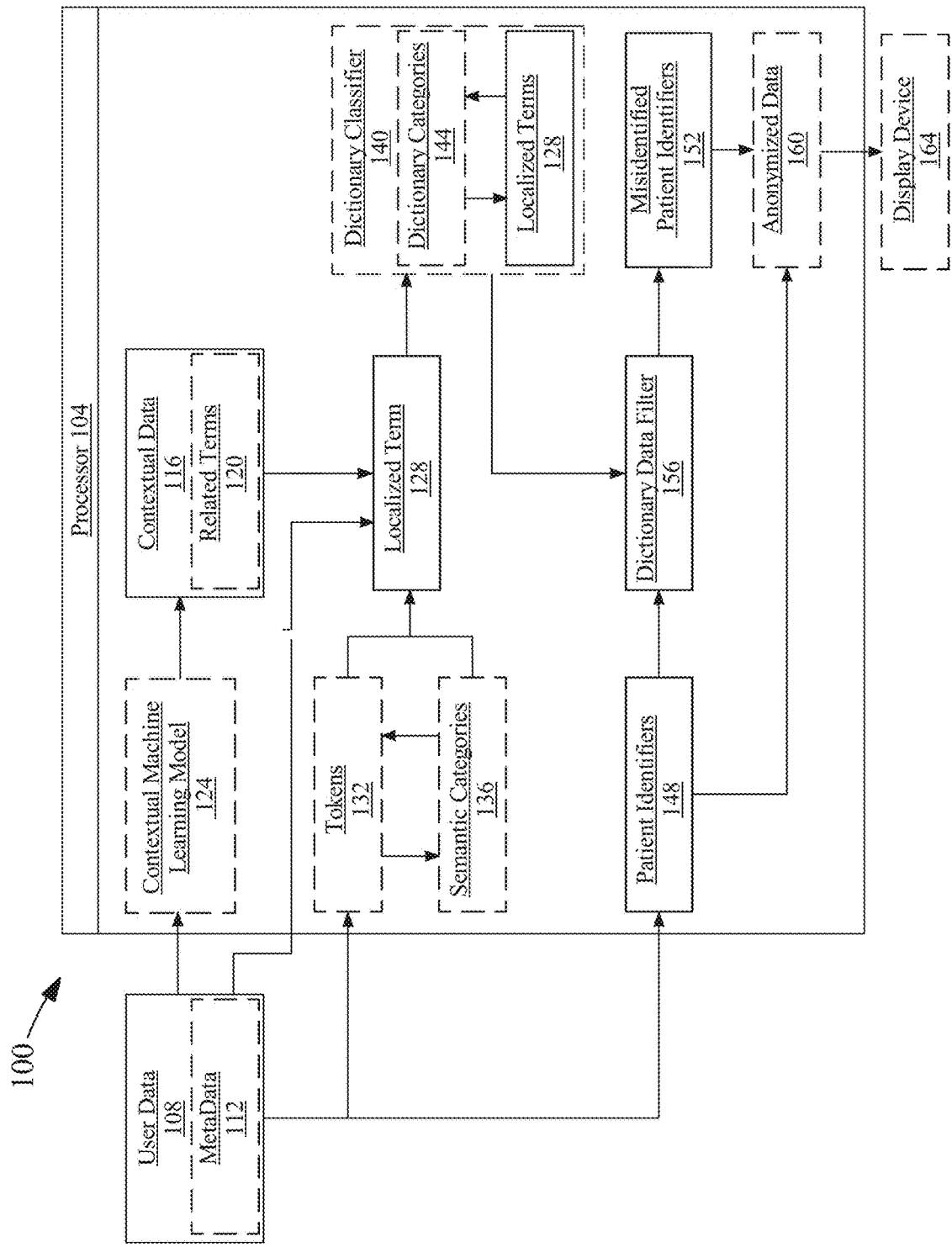
FIG. 1 is a block diagram of an exemplary embodiment of an apparatus for generating a dictionary data filter for data deidentification.

Referring now to FIG. 1, an exemplary embodiment of an apparatus 100 for the generation and implementation of a dictionary data filter is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive user data 108. As used in the current disclosure, "user data" is data related to the health and medical history of a patient or a group of patients. User data 108 may include information related to diagnosing and treating medical conditions, conducting research, managing patient care, physician observations, and making informed healthcare decisions. User data 108 may include a plurality of structured and unstructured data associated with patients. In some cases, user data 108 may include information from a plurality of electronic health records (EHRs). As used in the current disclosure, "electronic health records" are digital records containing a patient's medical history. This may include diagnoses, medications, treatment plans, and other relevant information. EHRs may be used to track and manage patient care. User data 108 may include information related to the results of medical testing. Medical testing may include various diagnostic procedures and examinations used to determine an individual's health status, identify diseases, and guide treatment decisions. These tests can be, biochemical involving blood or urine samples to measure substances indicative of health conditions; imaging, using techniques like X-rays or MRIs to visualize internal structures; or genetic, analyzing DNA to uncover inherited disorders. User data 108 may include data from blood tests, urine tests, biopsies, and other diagnostic tests that may be essential for assessing a patient's health and diagnosing diseases. User data 108 may include data associated with the vital signs of the user. This may include data such as blood pressure, heart rate, respiratory rate, and body temperature which are vital for monitoring a patient's condition and overall health. User data 108 may include information such as a plurality of medical imaging data. As used in the current disclosure, "medical imaging data" refers to the visual representations of the internal structures and functions of the body obtained through various imaging techniques. Medical imaging data may include data associated with X-rays, CT scans, magnetic resonance imaging, ultrasounds, PET scans, nuclear medicine imaging, mammography, fluoroscopy, ECG, EKG, and the like. User data 108 may include detailed notes and observations made by healthcare professionals during patient visits, providing additional context to the medical history. User data 108 may be collected in the course of clinical trials, studies, and medical research, which can include genomic data, epidemiological data, and more.

With continued reference to FIG. 1, user data 108 may come from one or more medical facilities. User data 108 may be received from a group of a related medical facilities. A group of related medical facilities may include several healthcare institutions that are linked either by ownership or through a formal network. These facilities can include hospitals, clinics, specialized care centers, rehabilitation units, research facilities, medical testing facilities, nursing homes, and the like that collaborate to provide a continuum of care to patients. The linkage among these facilities may enable them to share resources, expertise, documentation, short hand, and patient data more efficiently, promoting a more integrated approach to healthcare delivery. Such a group might operate under a shared administrative system, adhere to uniform quality standards, documentation standards, and use common information systems to streamline operations and patient care services.

With continued reference to FIG. 1, the user data 108 may include a plurality of multi-modal data. As used in the current disclosure, "multi-modal data" is data which includes a plurality of modalities data. Modalities of data may include images, text, audio, documents, electronic health records, sensor data, and the like. Multi-modal data may include textual data. As used in the current disclosure, "textual data" is a collection of data that consists of text-based information. Textual data may include any written information, such as documents, emails, notes, handwriting, chat conversations, and the like. Examples of textual data may include documents, captions, sentences, paragraphs, free-text fields, transcriptions, prognostic labels, and the like. Textual data may include data from a plurality of digital or handwritten notes. Notes may be written by a medical professional. The notes may depict conditions of the patient. Textual data may be associated with electronic health records (EHRs). Textual data may refer to the written or typed information that is recorded and stored as part of a patient's health record in a digital format. It includes a wide range of textual information that provides details about the patient's medical history, diagnoses, treatments, procedures, medications, observations, clinical notes, and other relevant healthcare information. Multi-modal data may include image data. As used in the current disclosure, "image data" is a collection of data that consists of data associated with a plurality of images. Image data encompasses visual representations captured through cameras or generated through medical imaging, graphs, microscopes, or other image capturing systems. Image data associated with electronic health records (EHRs) refers to the visual information that is linked or integrated with the patient's health record. It includes medical images such as X-rays, CT scans, MRI scans, ultrasound images, endoscopy images, pathology slides, and other types of diagnostic or clinical images.

With continued reference to FIG. 1, processor 104 may be configured to receive user data 108 from one or more external systems, such as without limitation, public databases, healthcare management systems, and the like using an application programming interface (API). As used herein, an "application programming interface" is a set of functions that allow applications to access data and interact with external software components, operating systems, or microdevices, such as another web application or computing device. An API may define the methods and data formats that applications can use to request and exchange information. APIs enable seamless integration and functionality between different systems, applications, or platforms. An API may deliver user data 108 to apparatus 100 from a system/application that is associated with a user, medical provider, or other third-party custodian of user information. An API may be configured to query web applications or other websites to retrieve user data 108 or other data associated with the user. An API may be further configured to filter through web applications according to a filter criterion. In this disclosure, "filter criterion" are conditions the web applications must fulfill in order to qualify for API. Web applications may be filtered based off these filter criterion. Filter criterion may include, without limitation, web application dates, web application traffic, web application types, web applications addresses, and the like. Once an API filters through web applications according to a filter criterion, it may select a web application. Processor 104 may transmit, through the API, user data 108 to apparatus 100. API may further automatically fill out user entry fields of the web application with the user credentials in order to gain access to the user data 108. Web applications may include, without limitation, a social media website, an online form, file scanning, email programs, third party websites, governmental websites, or the like.

Continuing to refer to FIG. 1, processor 104 may be configured to retrieve user data 108 from a database, such as an EHR database. In some embodiments, EHR database may be located in a hospital or hospital network's computing network. In some embodiments, EHR database may be located in the cloud.

Continuing to refer to FIG. 1, processor 104 may extract user data 108 from documents or other text received from the user using an optical character recognition system. Optical character recognition or optical character reader (OCR) may be applied upon submission of user data 108 into processor 104 and includes automatic conversion of images of written information (e.g., typed, handwritten or printed text) into machine-encoded text. In some cases, recognition of at least a keyword from an image component may include one or more processes, including without limitation OCR, optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to one or more handwriting recognition systems. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 may be configured to receive user data 108 comprising a plurality of metadata 112. As used in the current disclosure, "metadata" refers to descriptive or informational data that provides details about the User data 108. Metadata 112 may include descriptive metadata, wherein descriptive metadata is configured to describe the content, context, and structure of the data. This may include information such as time, geographic location, medical facility names, medical professional logs, patient names, patient IDs, patient data, X-rays, MRIs, CT scans, pet scans, ultrasounds, medical images, medical imaging dates, medical imaging technician information, along with any other patient specific data. Metadata 112 may be used to describe records of how the data has been accessed, utilized, or modified over time, aiding in understanding data usage patterns, and optimizing access. In an embodiment, metadata 112 may include Digital Imaging and Communications in Medicine (DICOM) data. Metadata 112 may refer to any form of data that can identify a patient including but not limited to metadata embedded on a medical image, this may include metadata DICOM headers. DICOM headers may include patient identity revealing information such as contours of head, body/organ profile, etc. In some embodiments, metadata 112 may provide details regarding the management and administration of the data, such as access rights, permissions, versioning, and preservation information. It may include information such as titles, authors, dates, keywords, summaries, and abstracts data or information that is collected, processed, or generated passively in the background without requiring direct input or actions from the user. This data is often gathered by applications, devices, or systems for various purposes, such as improving user experiences, enhancing functionality, or aiding in analytics.

With continued reference to FIG. 1, metadata 112 may be detached from the user data 108 using various methods and techniques depending on the type and structure of the data. Detaching metadata 112 from user data 108 is the process of separating identifying or contextual information from the core content or information provided by users. This practice may be useful for safeguarding individual privacy and data anonymity. By removing metadata, such as geolocation, timestamps, or other patient identifiers, from the associated data, it becomes significantly more challenging to trace the information back to specific individuals, thus reducing the risk of unauthorized surveillance or misuse of personal information. Detaching metadata may protect user privacy and maintain data integrity in an increasingly interconnected digital. In some cases, data profiling tools automatically analyze the dataset to detach metadata, including statistical summaries (e.g., min, max, mean, standard deviation), data distributions, unique values, and data quality metrics. Profiling tools can help understand the data's characteristics and identify anomalies. Additionally, Software tools may be used to analyze the data to infer its underlying schema or structure. This process involves identifying data types, keys, relationships, and constraints based on patterns and regularities within the dataset. It's especially useful for unstructured or semi-structured data. In a non-limiting embodiment, a natural language processing techniques can be used to extract metadata such as keywords, entities, topics, and sentiment analysis. NLP algorithms can automatically annotate and categorize text, providing valuable metadata about the content. Language processing techniques are discussed in greater detail below. In an additional embodiment, machine learning algorithms can be trained to identify and extract specific metadata elements from the dataset. For example, a model could be trained to recognize dates, names, or numerical values within the dataset. For datasets sourced from the web, web scraping techniques, mentioned herein above, can be employed to extract metadata from web pages. This could include extracting information about the source, publication date, author, or any other relevant metadata present on the web. In a third embodiment, metadata 112 may be extracted from the User data 108 utilizing APIs and data catalogs associated with specific datasets or data sources to provide standardized metadata. APIs often offer programmatic access to metadata and dataset information.

With continued reference to FIG. 1, processor 104 is configured to generate contextual data 116 associated with the plurality of user data 108. As used in the current disclosure, "contextual data" refers to the information that provides background or circumstances surrounding the use of a patient identifier. This data may be valuable for understanding the context in which user data 108 appears, going beyond the mere identification of information to include the surrounding textual data environment that gives additional meaning or clarification to the information. Contextual data 116 may include information that surrounds a term. This data may provide further insights or clarifications about the semantic meaning of a term as it is used within the user data 108. Contextual data 116 may include information about the relationship between a term and its surrounding text. This may include information describing how surrounding text modifies the meaning of the term. Processor 104 may generate contextual data 116 by analyzing the text or data around term to extract meaningful semantic information that can clarify the context in which the term was used. In non-limiting example, the term "b.p." has been identified within a string of text "The patient experienced an elevated b.p. for over 20 minutes." The processor 104 may analyze the surrounding text to determine that in this instance, "b.p." refers to "blood pressure." In an additional non-limiting example, the term "O.L.O.L" may be identified within a string of text stating "The patient arrived at O.L.O.L at approximately 11:36 pm" Based on the contextual data 116 provided by terms like "arrived at" may imply that "O.L.O.L." is a location.

With continued reference to FIG. 1, contextual data 116 may include information related to the semantic context of one or more terms within the user data 108. As used in the current disclosure, "semantic context" refers to the aspects of language that influence the meaning of words and phrases within a given text or discourse. Identifying the semantic context of a term may play a crucial role in determining the precise interpretation of terms and phrases. This involves analyzing not just the words themselves, but also the relationships between them, the sentence structures they are part of, and the broader discourse in which they occur. In an embodiment, the semantic context can clarify whether a term like "cold" refers to a common viral infection or a temperature condition in a clinical environment, based on its usage in the surrounding text. Contextual data 116 may be generated using advanced natural language processing (NLP) techniques such as syntax parsing, semantic role labeling, and context-aware word embeddings to dissect and understand these nuances. These technologies enable processors to grasp subtle meanings that change with context, enhancing the accuracy of data interpretation. The NLP techniques are discussed in greater detail herein below. The analysis of semantic context may be used to distinguish between homonyms and polysemous words, where the same word may have multiple meanings depending on its usage. For instance, "lead" could refer to a clinical symptom (lead poisoning), an action (to lead a team), or a physical object (a metal). By evaluating the semantic context, systems can accurately categorize and respond to data inputs, significantly improving the relevance and precision of the information extracted from large datasets.

With continued reference to FIG. 1, generating contextual data 116 may include identifying a set of related terms 120 within the plurality of user data 108. As used in the current disclosure, a "related term" is a phrase or term that contextualizes one or more terms within user data 108. Related terms 120 may be phrases or terms that, when analyzed together with other surrounding text, enhance the understanding of those terms by providing additional contextual layers. A related term 120 may be derived from the surrounding text a targeted term. This approach acknowledges that the meaning of a term can significantly shift based on its context. By crafting related term 120, apparatus 100 may be able to gain a nuanced understanding of terms within user data 108, going beyond the term's literal interpretation. The process of identifying these related terms 120 may involve sophisticated text analysis techniques, including natural language processing (NLP) and semantic linking. For example, in medical records, linking terms such as "fever" and "cough" with "cold" can help differentiate a common cold from other types of medical issues. In an embodiment, related terms 120 may include more than just words they may include any string of alphanumeric characters or the format of a string of alphanumeric characters. Crafting related terms 120 may aid in enhancing interpretive accuracy but also improves search and retrieval capabilities and facilitates more effective data mining. However, identifying meaningful relationships between terms can be complex, particularly in texts with ambiguous language or specialized terminology.

With continued reference to FIG. 1, processor 104 may identify contextual data 116 using a contextual machine-learning model 124. As used in the current disclosure, a "contextual machine-learning model" is a machine-learning model that is configured to generate contextual data 116. contextual machine-learning model 124 may be consistent with the machine-learning model described below in FIG. 2. Inputs to the contextual machine-learning model 124 may include user data 108, metadata 112, examples of related terms 120, examples of contextual data 116, and the like. Outputs to the contextual machine-learning model 124 may include contextual data 116 tailored to the user data 108. Contextual machine learning model may employ natural language processing techniques as discussed in greater detail herein below. Contextual training data may include a plurality of data entries containing a plurality of inputs that are correlated to a plurality of outputs for training a processor by a machine-learning process. In an embodiment, contextual training data may include a plurality of user data 108 correlated to examples of contextual data 116. contextual training data may be received from database 300. contextual training data may contain information about user data 108, metadata 112, examples of related terms 120, examples of contextual data 116, and the like. In an embodiment, contextual training data may be iteratively updated as a function of the input and output results of past contextual machine-learning model 124 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 is configured to identify a plurality of localized terms 128 as a function of the contextual data 116 and the plurality of user data 108. As used in the current disclosure, a "localized term" refers to a specific word or phrase that is uniquely defined or used within a particular hospital or hospital system. These terms often involve shorthand notations, jargon, and/or slang terms that are customary to the facility and may not be universally recognized outside of that specific medical environment. Localized terms 128 can vary widely between different institutions due to regional practices, specific medical specialties, or even due to the preferences of the medical staff. Localized terms 128 may have been tailored to the semantic needs and operational efficiencies of the hospital and is part of a unique lexicon developed to streamline communication and documentation among healthcare providers within that system. In a non-limiting example, one medical facility might use the term "Code Blue" to refer specifically to a cardiac arrest occurring within the hospital, while another might extend the term to include medical emergencies involving respiratory arrest. Similarly, localized terms 128 may include shorthand notations like "A&O×3" commonly mean "alert and oriented to person, place, and time," but additional nuances might be added in different settings. The use of localized terms 128, while beneficial, also presents challenges, especially in the standardization of medical communication across different healthcare facilities and medical systems. As the processor identifies and adapts to these localized terms 128, it also may ensure that they are integrated into a system that interprets the term correctly within its semantic context. This is particularly important when information must be shared with other facilities or with healthcare providers who may not be familiar with the localized jargon.

With continued reference to FIG. 1, processor 104 may identify localized terms 128 by scanning through clinical notes, medical records, and other forms of unstructured user data 108 to detect and catalog terms that are specific to the particular medical environment. By leveraging contextual data 116, the processor 104 enhances the accuracy with which these terms are identified and understood, ensuring that the specific nuances and definitions unique to each hospital are correctly applied.

With continued reference to FIG. 1, processor 104 may identify localized terms using a natural language processing model. As used in the current disclosure, a "natural language processing (NLP) model" is a computational model designed to process and understand human language. It leverages techniques from machine learning, linguistics, and computer science to enable computers to comprehend, interpret, and generate natural language text. The NLP model may preprocess the textual data, wherein the input text may include all text contained within the user data 108 its associated metadata 112, or any other data mentioned herein. Preprocessing the input text may involve tasks like tokenization (splitting text into individual words or sub-word units), normalizing the text (lowercasing, removing punctuation, etc.), and encoding the text into a numerical representation suitable for the model. The NLP model may include transformer architecture, wherein the transformers may include deep learning models that employ attention mechanisms to capture the relationships between words or sub-word units in a text sequence. They consist of multiple layers of self-attention and feed-forward neural networks. The NLP model may weigh the importance of different words or sub-word units within a text sequence while considering the contextual data 116. This may enable the model to capture dependencies and relationships between words, considering both local and global contexts. The NLP model may include a program automatically generated by processor 104 to produce associations between one or more related terms 120 extracted from the user data 108 its associated metadata 112 and detect associations, including without limitation mathematical associations, between such related terms 120 and the localized terms 128. Associations between language elements, where language elements include for purposes herein extracted significant terms, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted significant term indicates a given category of semantic meaning. As a further example, statistical correlations and/or mathematical associations may include probabilistic formulas or relationships indicating a positive and/or negative association between at least an extracted significant term and/or a given semantic relationship; positive or negative indication may include an indication that a given document is or is not indicating a category semantic relationship. Whether a phrase, sentence, word, or other textual element in the user data 108 its associated metadata 112 constitutes a positive or negative indicator may be determined, in an embodiment, by mathematical associations between detected significant terms, comparisons to phrases and/or words indicating positive and/or negative indicators that are stored in memory at processor 104, or the like.

With continued reference to FIG. 1, processor 104 may generate a plurality of tokens 132 by tokenizing the user data 108 using the NLP model. As used in the current disclosure, a "token" refers to an individual piece of a larger string of text, such as a one or more words, numbers, punctuation marks, and/or alphanumeric codes. This process of breaking down text into smaller elements (tokens) is essential for computational models to analyze and interpret language. Tokenization may allow machines to process and understand text by converting it into manageable, discrete units, making it easier to perform tasks such as parsing, syntactic analysis, and semantic analysis. Each token may be a building block in the structure of the text, carrying meaning or function that contributes to the overall interpretation of the text. For example, in the sentence "The patient appears to be intoxicated," the tokens 132 would typically be "Patient," "appears," "intoxicated," and potentially the period at the end if punctuation is included in the tokenization process. These tokens 132 then serve as input for further processing steps in NLP applications, such as machine translation, sentiment analysis, or information retrieval, where the understanding of individual terms and their arrangement is crucial.

With continued reference to FIG. 1, tokenization may allow processor 104 to analyze and understand the text at a more granular level, by identifying and processing each token separately. In an embodiment, processor 104 may employ one or more artificial intelligence algorithms to identify and analyze the tokenized text, discussed in greater detail herein below. In an embodiment, at least a portion of the tokens 132 that are identified by the NLP may be considered related term 120 and/or localized terms 128. Identifying related terms 120 and/or localized terms 128 from tokenized textual data may involve processing and analyzing the text to extract meaningful and relevant keywords. Once the text is tokenized, various techniques may be applied to identify related terms 120 and/or localized terms 128. These techniques may include frequency analysis, where frequently occurring tokens are considered potential keywords, or more sophisticated methods like natural language processing (NLP) techniques that analyze the context, semantic meaning, and relationships between tokens.

With continued reference to FIG. 1, processor 104 may sort the tokens 132 into one or more semantic categories 136. As used in the current disclosure, a "semantic category" is a group in which words, phrases, or tokens are organized based on their meanings and relationships to one another. Semantic categories 136 may help in organizing the plurality of tokens 132 in a way that supports more effective information retrieval, text analysis, and natural language processing tasks. Processor 104 may sort these tokens into at least two distinct semantic categories. The first category encompasses tokens whose semantic meanings are known and well-established and clearly understood. This category typically includes medical terms, acronyms, and phrases that are commonly recognized within the healthcare industry, such as specific medical procedures, diagnostic terms, and other relevant identifiers like names, places, and dates. The second category, in contrast, is reserved for tokens whose semantic meanings are ambiguous or unknown. This might include jargon, emerging medical terms, or other phrases that are not yet clearly defined within the existing medical lexicon. The tokens that might fall into the second category can vary widely, especially in fields like medicine that are continually evolving. Examples of tokens 132 classified into the second category may include terminology that arises from recent medical research or technology that might not be widely recognized or understood. For instance, terms related to novel treatments or newly discovered pathogens might fall into this category until they become mainstream. Examples of tokens 132 classified into the second category may include specialized jargon used in sub-disciplines of medicine that may not be familiar outside of those specific areas. For example, terms used in genomic medicine or rare biochemical pathways might be unclear to general practitioners. Additional examples of tokens 132 may be classified into the second category and may include acronyms or abbreviations that have not yet been widely adopted or whose meanings are not uniformly recognized across the medical community. An example could be an uncommonly used abbreviation for a specific diagnostic test or treatment protocol. More examples of tokens 132 that may be classified into the second category may include terms associated nicknames and/or shorthand notations that might not be widely recognized within existing medical lexicon.

With continued reference to FIG. 1, processor 104 may classify tokens 132 from unstructured user data 108 into semantic categories 136. Processor 104 may identify and extract tokens words, phrases, or other lexical units from user data 108. These tokens 132 may then be subjected to semantic analysis where the processor, using algorithms, determines their meanings by understanding the contextual usage of the terms. The classification into semantic categories may be twofold. The first category comprises tokens with well-established meanings widely recognized within the medical community, like standard procedures ("MRI") or common diagnoses ("diabetes"), which are readily sorted based on a comprehensive medical lexicon. The second category includes tokens with ambiguous or emerging meanings that are not yet fully recognized. The processor 104 may employ NLP techniques such as semantic disambiguation to evaluate if the context of a token matches any known medical terms and uses predictive modeling to consider possible future relevancies as medical knowledge evolves.

With continued reference to FIG. 1, semantic disambiguation may be a process in natural language processing (NLP) where the meaning of a word or phrase that has multiple interpretations is clarified based on its context. This is particularly essential in dealing with languages where many words are polysemous (having multiple meanings) and can lead to confusion or inaccurate data processing if interpreted incorrectly. Semantic disambiguation plays a crucial role in ensuring the accuracy and relevance of the data being categorized by processor 104. For instance, the term "cold" could refer to a common viral infection or a low temperature environment, depending on the context within a medical document. Processor 104 may employ semantic disambiguation to analyze the contextual data 116 of each token 132 to determine its appropriate meaning. This may involve examining other words, phrases, and possibly the syntactic structure around the term to infer its correct interpretation within the medical domain. By implementing semantic disambiguation, the processor 104 can accurately classify tokens into the correct semantic categories 136.

With continued reference to FIG. 1, processor 104 may generate contextual data 116 as function of the classification of tokens 132 into the first category. Once tokens are identified and categorized into this first category, processor 104 uses this classification to produce contextual data 116 that enriches the initial token data. This contextual enhancement might include linking these terms to related medical concepts, patient records, or treatment protocols, thereby providing a more comprehensive understanding of the data. For instance, the term "angioplasty" would not only be identified as a procedure but also contextualized with information regarding typical recovery times, potential complications, and common medication treatments. This process ensures that the data is not just categorized but also augmented, improving the utility and accuracy of medical data systems in clinical decision-making and research applications.

With continued reference to FIG. 1, processor 104 may identify a plurality of localized terms 128 as a function of the classification of the tokens into the second category and the contextual data 116. Processor 104 may identify tokens 132 whose meanings are not clearly established or are subject to regional variations. Processor 104 then may cross-reference these tokens with contextual data 116, which encompasses well-defined terms and their associated information, to pinpoint potential localized uses and meanings. This identification process for localized terms 128 may leverage the initial classification and contextual enhancements to pinpoint terms that are particularly relevant in certain localities but might be unknown or considered non-standard elsewhere. For example, a particular therapy name used predominantly in a specific medical facility could be recognized and categorized accordingly. By linking these localized terms 128 with the broader contextual data 116 already processed, processor 104 can enhance the relevance and accuracy of the medical data system, making it more adaptable to regional variations and specificities in medical practice. In an embodiment, a token placed in the second category due to its ambiguous nature might be linked to specific contextual data 116 indicating its use in certain medical settings or locales. Processor 104 may examine this linkage to understand and confirm the localized significance of the token 132. This might involve analyzing usage patterns within specific hospitals or regions, or cross-referencing databases that track regional medical terminology and practices. Through this intelligent cross-referencing, processor 104 may successfully identify localized terms 128, which are essential for creating a lexicon that respects regional nuances in medical terminology. This ability enhances the processor's utility in diverse medical environments, ensuring that the language used in one setting is accurately interpreted and documented when shared with others, thus supporting clear and effective medical communication.

With continued reference to FIG. 1, processor 104 may identify a plurality of localized terms 128 by analyzing their proximity to at least one related term from a set of related terms 120. This method leverages the natural language processing (NLP) capabilities of the processor to parse and understand the context in which terms appear within the user data. Essentially, the processor examines the textual environment of each localized term 128 focusing on how these terms are situated relative to recognized related terms 120. This proximity analysis is crucial as it provides valuable insights into the contextual and semantic relationships between terms. In an embodiment, if the localized term "Pink Puffer" is found near related terms such as "complexion" and "breathing," the processor can infer that "Pink Puffer" refers to a specific presentation of chronic obstructive pulmonary disease (COPD), rather than other possible meanings of the word. By employing algorithms that assess the distances and patterns of term occurrences within the text, the processor can discern patterns that indicate specific, context-dependent meanings of localized terms. This proximity-based identification may be used to effectively categorize and understand localized terms 128 within their specific usage contexts. It helps in accurately interpreting the data by linking localized terms 1287 to their relevant semantic fields based on their associations with related terms. Such an approach not only enhances the precision of data analysis but also improves the usability of the data, making it more reliable for further processing and decision-making tasks. This technique is especially useful in environments with specialized vocabularies or in regions where certain terms have unique meanings not widely recognized outside these contexts.

With continued reference to FIG. 1, processor 104 may generate localized terms 128 using a local machine-learning model. As used in the current disclosure, a "Local machine-learning model" is a machine-learning model that is configured to generate localized terms 128. Local machine-learning model may be consistent with the machine-learning model described below in FIG. 2. Local machine-learning model may be configured to be local to processor 104. This may mean that the local machine-learning model operates directly within the processor's hardware environment, rather than relying on external servers or cloud-based systems. This setup allows for faster data processing and immediate response times since the computations are performed on-site. It may also enhance data privacy and security, as sensitive information does not need to be transmitted over the internet or stored externally. Inputs to the local machine-learning model may include contextual data 116, user data 108, related terms 120, examples of localized terms 128, and the like. Outputs to the Local machine-learning model may include localized terms 128 tailored to the user data 108 and contextual data 116. Local machine learning model may be configured to identify localized terms by classifying tokens 132 into one or more semantic categories 136. Local machine learning model may also be configured to identify localized terms as a function of their proximity to related terms 120. Local training data may include a plurality of data entries containing a plurality of inputs that are correlated to a plurality of outputs for training a processor by a machine-learning process. In an embodiment, Local training data may include a plurality of user data 108 and contextual data 116 correlated to examples of localized terms 128. Local training data may be received from database 300. Local training data may contain information about contextual data 116, user data 108, related terms 120, examples of localized terms 128, and the like. In an embodiment, local training data may be iteratively updated as a function of the input and output results of past Local machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 may be configured to classify the plurality of localized terms 128 to at least one dictionary category 144 using dictionary classifier 140. As used in the current disclosure, a "dictionary category" is data structure configured to organize words based on their meanings, usually within a dictionary or a linguistic database. These categories function as semantic classifications that group together words or tokens 132 that share similar meanings, usage contexts, or other linguistic properties. Each dictionary category 144 may be defined by its semantic characteristics, encompassing not just synonyms but also broader concepts, specific uses, or associated phrases. In a non-limiting example, the term "pink puffer," is used by some medical communities to describe a patient with a specific presentation of chronic obstructive pulmonary disease (COPD) characterized by a pink complexion and labored breathing. Associating such terms with their clear semantic meanings in a dictionary category under categories like "Respiratory Conditions" can help bridge the gap between colloquial language and clinical terminology. This process not only aids in training and orientation but also ensures that patient care remains consistent and informed across different healthcare environments. By linking these unclear or unknown abbreviations and jargon to their precise meanings, healthcare providers can enhance communication and reduce the risk of errors in patient management. In an embodiment, processor 104 may identify the localized term 128 "blue bloater." Some medical professionals may use this term to describe a patient with another form of chronic obstructive pulmonary disease (COPD) that involves chronic bronchitis. Typically, these patients may appear blue due to lack of oxygen (cyanosis) and have a bloated appearance because of fluid retention. Classifying "Blue Bloater" under a category such as "Respiratory Conditions" in medical dictionaries helps clarify the term for those unfamiliar with this specific term, ensuring accurate and efficient patient assessments.

With continued reference to FIG. 1, in a non-limiting example, processor 104 may identify the localized term 128 "CABG." This abbreviation may be used to describe Coronary Artery Bypass Graft. While the abbreviation may be widely known within a given department or hospital, it might be confusing to people who are not associated with that medical facility. This localized term 128 may be classified to dictionary category 144 like "Cardiac Procedures".

With continued reference to FIG. 1, in a non-limiting example, processor 104 may identify the localized term 128 "TOF." TOF may be a congenital heart defect that is critical for pediatricians and cardiologists but might be less familiar to healthcare providers outside these specialties. Listing it under a category such as "Congenital Heart Defects" in medical lexicons can aid in broader comprehension and inter-departmental communication.

With continued reference to FIG. 1, dictionary classifier 140 that pairs localized terms 128 to dictionary categories 144 may map specific terms to categories that encapsulate their meanings. This process may include compiling a list of localized terms 128, which may include specialized jargon, regional dialects, or industry-specific terminology that is not universally recognized. Each localized term 128 may be analyzed to understand its context and usage within its specific environment. The classifier 140 may employ a variety of linguistic tools and algorithms to identify the semantic core of each localized term 128. This may involve breaking down the term into its morphological components, analyzing its syntactic role in sentences, and understanding its pragmatic use cases. Machine learning models, particularly those trained on large datasets of language use, can predict the semantic category 136 that best fits the localized term based on similarities to known words or phrases within the same category. Once a probable semantic category 133 is identified for a localized term 128, the classifier checks this prediction against a pre-defined dictionary categories 144, which contains descriptions and examples of each category's meaning and use. These categories may act as a reference framework, ensuring that each term is categorized accurately according to established semantic meanings. The final step may include refining the categorization through feedback mechanisms-either from human oversight or additional computational checks—that verify the appropriateness of the semantic linkage. This dynamic interplay between localized understanding and broader semantic categories helps create a nuanced, yet standardized, lexicon that facilitates clearer communication across different regions and contexts.

With continued reference to FIG. 1, processor 104 generates a dictionary classifier 140 as a function of the plurality of localized terms 128. As used in the current disclosure, a "dictionary classifier" is a classifier that is configured to classify a plurality of localized terms 128 to their semantic meaning. Dictionary classifier may be consistent with the classifier described below in FIG. 2. Inputs to the dictionary classifier 140 may include user data 108, metadata 112, contextual data 116, related terms 120, examples of localized terms 128, examples of dictionary categories 144, and the like. Outputs to the dictionary classifier 140 may include localized terms 128 classified to one or more dictionary categories 144. Dictionary training data may include a plurality of data entries containing a plurality of inputs that are correlated to a plurality of outputs for training a processor by a machine-learning process. In an embodiment, dictionary training data may include a plurality of dictionary categories 144 correlated to examples of localized terms 128. Dictionary training data may be received from database 300. Dictionary training data may contain information about user data 108, metadata 112, contextual data 116, related terms 120, examples of localized terms 128, examples of dictionary categories 144, and the like. In an embodiment, dictionary training data may be iteratively updated as a function of the input and output results of past dictionary classifier or any other classifier mentioned throughout this disclosure. In an embodiment, a dictionary classifier 140 may refer to a plurality of machine learning models and/or classifiers. Each machine learning model may be trained on a unique set of training data. These models may be designed to recognize different types and styles of localized terms 128 including acronyms, slang, and other unclear/ambiguous terms. The process of identifying localized terms 128 within a dataset may involve combining the results from each of the plurality of machine learning models. This aggregation step may ensure that the system can accurately and comprehensively identify individual localized terms 128 across different databases or records. The classifier may use, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifier, and the like.

With continued reference to FIG. 1, dictionary classifier 140 may be configured to classify localized terms 128 to dictionary categories 144 using any NLP techniques discussed herein. This classifier 140 may utilize a combination of tokenization, semantic disambiguation, and contextual analysis to efficiently map localized terms to their appropriate semantic meanings within the dictionary categories. Initially, the NLP model may process the raw textual data with the user data 108. This may involve breaking down the text into tokens 132. This tokenization allows the dictionary classifier 140 to analyze each word or phrase in isolation as well as in context. Following tokenization, semantic disambiguation may be applied to resolve ambiguities in the meanings of these localized terms 128, particularly crucial for terms that might have multiple interpretations. For example, the term "Code Blue" can refer to a to multiple things withing a medical context, and the classifier 140 may employ contextual data 116 to determine the correct category for each usage based on surrounding words, phrases, and the syntactic structure of the text. This contextual understanding is derived from the semantic relationships and dependencies identified by the model's transformer architecture, which employs deep learning models with attention mechanisms to evaluate the importance and relationship of words within the text. In some embodiments, the classifier may utilize statistical correlations and mathematical associations to strengthen the categorization process. By analyzing the frequency of terms and their co-occurrence with other known category terms, the classifier 140 may predict the likelihood of a localized term belonging to a specific dictionary category. This approach not only improves the accuracy of the classification but also ensures that the terms are placed in the most semantically relevant categories, thereby enhancing the overall utility of the dictionary in capturing and representing the nuanced meanings of localized medical terminology.

With continued reference to FIG. 1, machine learning plays a crucial role in enhancing the function of software for generating a dictionary classifier 140. This may include identifying patterns within the user data 108 and contextual data 116 that lead to changes in the capabilities of the dictionary classifier 140. By analyzing vast amounts of data related to user data 108, machine learning algorithms can identify patterns, correlations, and dependencies that contribute to the generation of dictionary classifier 140. These algorithms can extract valuable insights from various sources, including text, document, EHRs, medical records, and the like. By applying machine learning techniques, the software can generate classify localized term 128 to dictionary categories 144 extremely accurately and quickly. Machine learning models may enable the software to learn from past collaborative experiences of the entities and iteratively improve its training data over time.

Still referring to FIG. 1, dictionary classifier 140 may include a large language model (LLM). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, user records, business documents, inventory documentation, emails, and the like. In some embodiments, training sets of an LLM may include information from one or more public or private databases. As a non-limiting example, training sets may include databases associated with an entity. In some embodiments, training sets may include portions of documents associated with the medical records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction-based algorithm configured to receive an article and apply a probability distribution to the words already typed in a sentence to work out the most likely word to come next in augmented articles. For example, if some words that have already been typed are "The patient has been diagnosed with," then it may be highly likely that the word "diabetes" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you," with "how" and "are." It's also possible that an LLM learns that words structured in this pattern are typically a question and to respond appropriately. In some embodiments, to achieve self-attention, input may be fed into three distinct fully connected neural network layers to create query, key, and value vectors. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens".

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with contextual data as an input correlated to examples of localized terms as an output.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, processor 104 may be configured to update the dictionary training data of the dictionary classifier 140 using user inputs. A dictionary classifier 140 may use user input to update its training data, thereby improving its performance, speed, and accuracy. In embodiments, the dictionary classifier 140 may be iteratively updated using input and output results of past iterations of the dictionary classifiers 140. The dictionary classifier 140 may then be iteratively retrained using the updated dictionary training data. For instance, and without limitation, dictionary classifier 140 may be trained using a first training data from, for example, and without limitation, training data from a user input or database. The dictionary classifier 140 may then be updated by using previous inputs and outputs from the dictionary classifier 140 as second set of training data to then retrain a newer iteration of dictionary classifier 140. This process of updating the dictionary classifier 140 and its associated training data may be continuously done to create subsequent dictionary classifiers 140 to improve the speed and accuracy of the dictionary classifier 140. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience. The discussion within this paragraph may apply to both the dictionary classifier 140 and any other machine-learning model/classifier discussed herein.

Incorporating the user feedback may include updating the training data by removing or adding correlations of user data to a path or resources as indicated by the feedback. Any machine-learning model as described herein may have the training data updated based on such feedback or data gathered using any method described herein. For example, when correlations in training data are based on outdated information, a web crawler may update such correlations based on more recent resources and information.

With continued reference to FIG. 1, processor 104 may use user feedback to train the machine-learning models and/or classifiers described above. For example, machine-learning models and/or classifiers may be trained using past inputs and outputs of the machine-learning model. In some embodiments, if user feedback indicates that an output of machine-learning models and/or classifiers was "unfavorable," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, machine-learning models may be retrained with modified training data as described in further detail below. In some embodiments, training data of classifier may include user feedback.

With continued reference to FIG. 1, in some embodiments, an accuracy score may be calculated for the machine-learning model and/or classifier using user feedback. For the purposes of this disclosure, "accuracy score," is a numerical value concerning the accuracy of a machine-learning model. For example, the accuracy/quality of the output dictionary classifier 140 may be averaged to determine an accuracy score. In some embodiments, an accuracy score may be determined for pairing of entities. Accuracy score or another score as described above may indicate a degree of retraining needed for a machine-learning model and/or classifier. Processor 104 may perform a larger number of retraining cycles for a higher number (or lower number, depending on a numerical interpretation used), and/or may collect more training data for such retraining. The discussion within this paragraph and the paragraphs preceding this paragraph may apply to both the dictionary classifier 140 and/or any other machine-learning model/classifier mentioned herein.

With continued reference to FIG. 1, processor 104 identifies a plurality of patient identifiers 148 within the plurality of user data 108. As used in the current disclosure, "patient identifiers" refers to information used to identify and distinguish individual patients in healthcare records and systems. Patent identifiers 148 may include any identifiers described in the Health Insurance Portability and Accountability Act (HIPAA). Examples of patient identifiers include the name, address, phone number, email address, phone number, email address, social security number (SSN), national identification number, medical record number, health insurance information, beneficiary information, account numbers, and the like. Patient identifiers 148 may additionally include social media, web addresses, IP addresses, biometric identifiers (i.e., fingerprints, voice prints, and the like.), full face photographic images, any comparable images, and the like. Patient identifiers 148 may include all geographic subdivisions smaller than a state, including street address, city, county, precinct, zip code, and their equivalent geocodes. Processor 104 may also identify a plurality of patient identifiers 148 within the metadata 112 associated with the plurality of user data 108. In an embodiment, patient identifiers 148 may include temporal data. As used in the current disclosure, "temporal data" is data related to the date or time that an event occurred. Temporal data may be any time or date that is a part of the user data 108. Temporal data may include all dates directly related to an individual, including birth date, admission date, discharge date, date of death, and the like. Temporal data may include data associated with the date medical image or a medical test was taken. Temporal data may include dates associated with surgery, procedure, admission, medical professional examinations/appointments, medical tests, symptoms, date of birth, date of death, and the like. Processor 104 may identify a plurality of patient identifiers 148 using a named entity recognitions system, data extraction from an EHR, an identification Machine Learning model, contextual analysis, and the like. In an embodiment, generate a plurality patient identifiers 148 using a natural language processing model, as discussed herein above.

With continued reference to FIG. 1, processor 104 may identify a plurality of patient identifiers 148 using a named entity recognition (NER) system. As used in the current disclosure, a "named entity recognition (NER) system" is software that identifies a plurality of named entities in from text. A NER system may be configured to identify a plurality of named entities from user data 108 its associated metadata 112. Inputs of a NER system may include a user data 108, metadata 112, and the like. The output of a named entity recognition system may include a plurality of named entities associated with known patient identifiers 148. Named entities may include a structured representation of the identified named entities, typically in the form of annotations or tags attached to the original text.

With continued reference to FIG. 1, processor 104 may identify a plurality of patient identifiers 148 using a pattern recognition process. As used in the current disclosure, a "pattern recognition process" is a process configured to recognize specific patterns or structures commonly associated with patient identifiers. Processor 104 may be configured to define one or more patterns associated with the plurality of patient identifiers 148. These patterns can be based on regular expressions or specific rules that describe the format of each identifier. In a non-limiting example, a pattern for recognizing temporal data might be in the format "MM/DD/YYYY." In an additional non-limiting example, a pattern for recognizing an SSN might be in the format "XXX-XX-XXXX." In some cases, the user data 108 may be segmented into discrete sections or fields, such as patient demographics, medical history, and clinical notes. The pattern recognition process may be applied to each section separately to identify patient identifiers 148. The processor 104 may compare the text within each section of the user data 108 to the predefined patterns. It looks for instances where the text matches the expected pattern for a particular identifier. In a non-limiting example, if the pattern recognition algorithm encounters a sequence of numbers in the format "MM/DD/YYYY," it may identify this as a date of birth.

With continued reference to FIG. 1, processor 104 may identify a plurality of patient identifiers 148 using an identification machine-learning model. As used in the current disclosure, an "identification machine-learning model" is a machine-learning model that is configured to identify a plurality of patient identifiers 148. An identification machine-learning model may be consistent with the machine-learning model described below in FIG. 2. Inputs to the identification machine-learning model may include user data 108, metadata 112, examples of plurality of patient identifiers 148, and the like. Outputs to the identification machine-learning model may include plurality of patient identifiers 148 tailored to the user data 108 its associated metadata 112. Identification training data may include a plurality of data entries containing a plurality of inputs that are correlated to a plurality of outputs for training a processor by a machine-learning process. In an embodiment, identification training data may include a plurality of user data 108 its associated metadata 112 correlated to examples of plurality of patient identifiers 148. Identification training data may be received from database. Identification training data may contain information about user data 108, metadata 112, examples of plurality of patient identifiers 148, and the like. In an embodiment, identification training data may be iteratively updated as a function of the input and output results of past identification machine-learning model or any other machine-learning model mentioned throughout this disclosure. In an embodiment, an identification machine-learning model may refer to a plurality of machine learning models. Each machine learning model may be trained on a unique set of training data. These models may be designed to recognize different patient identifiers 148, such as medical record numbers, insurance IDs, or patient names. The process of identifying PII within a dataset may involve combining the results from each of the plurality of machine learning models. This aggregation step may ensure that the system can accurately and comprehensively identify individual PII across different databases or records. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 is configured to identify one or more misidentified patient identifiers 152 within the plurality of patient identifiers 148 using a dictionary data filter. As used in this disclosure, a "misidentified patient identifier" refers to a term or set of terms that have been incorrectly classified either as a patient identifier or as a non-patient identifier. Misidentified patient identifiers 152 may include misclassified localized terms 128 found within the plurality of patient identifiers 148 using a dictionary data filter. Misidentified patient identifiers 152 may refer to terms that have been incorrectly tagged in medical records either as identifiers of patients (such as names, social security numbers, or medical record numbers) or erroneously as non-identifiers (terms that are not meant to identify a patient but are part of medical terminology or descriptions). This misclassification stems from challenges inherent in automated data processing systems used in healthcare. The process of identifying patient identifiers 148 among a vast array of medical terms may require precision and contextual understanding. In a non-limiting example, a term like "J.M.M.C" out of context may be classified as a non-patient identifier 148, but within the localized context it may be known that the abbreviation stands for "James Madison Medical Center" which may be patient identifier 148. Automated systems might mistakenly tag both instances as patient identifiers due to the term's appearance as a proper noun, commonly used for names.

With continued reference to FIG. 1, misidentifications of patient identifiers 148 can arise for several reasons, including the misinterpretation of data by automated. In an embodiment, terms such as drug names, medical devices, procedures, or conditions might be erroneously tagged as personally identifiable information (PII). This misclassification often results from the automated system's inability to properly contextualize these terms, leading to the incorrect assumption that proper nouns or capitalized words are patient names or other forms of PII. The challenge may be exacerbated in the medical field where terminology is dense, specialized, and context-dependent, with many terms carrying multiple meanings depending on their use case. An automated system's failure to grasp the full context can lead to these terms being misidentified as patient identifiers. Furthermore, if a machine learning model is overly trained on specific datasets, it may not perform well when exposed to new, unseen data, leading to a high rate of such errors. These models might not effectively distinguish between actual patient identifiers and unrelated medical terms. Additionally, healthcare records and user data may contain numerous ambiguous terms; without clear rules for disambiguation, systems might err on the side of caution and wrongly classify non-identifiers as patient information, in an effort to minimize the risk of overlooking genuine identifiers.

With continued reference to FIG. 1, the system may utilize a dictionary data filter 156 to identify misidentified patient identifiers 152 within the plurality of patient identifiers 148. As used in the current disclosure, a "dictionary data filter" is a data filter configured to discern and validate the nature of terms based on an extensive database of definitions and usage contexts. This filter is particularly adept at handling localized terms 128-words or phrases that might have specific meanings or uses within particular geographic, institutional, or professional contexts. By incorporating these localized understandings into its filtering process, the system aims to reduce the incidence of misidentified terms by refining the criteria under which terms are classified as patient identifiers or not. Using this dictionary data filter 156, the system may analyze each term's relevance and appropriateness as a patient identifier 148, considering both general and localized usage. This dual-layer filtering is crucial for minimizing false positives and negatives in patient data management, ensuring that the data used for patient care, billing, and reporting is accurate and reliable. This not only improves the efficiency of healthcare services but also enhances patient privacy by safeguarding against the misclassification of personal information.

With continued reference to FIG. 1, the dictionary data filter 156 may be constructed based on the systematic pairing of localized terms 128 with their respective semantic categories. This may involve mapping each localized term 128 to a category that best represents its meaning within a specific context, such as medical, legal, or technical fields as done by the dictionary classifier 140. The dictionary data filter 128 may include a comprehensive definition of each localized term, providing clear and precise explanations that encapsulate not only the term's basic meaning but also its usage in context. The process of creating this filter may require in-depth analysis and classification work, where terms are evaluated for their semantic properties and aligned with the appropriate categories. This pairing process may ensure that the filter can effectively interpret and manage the localized terms, making it an invaluable tool for enhancing data processing accuracy and efficiency.

With continued reference to FIG. 1, processor 104 a dictionary data filter 156 may include a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase, or even stored in hardware in application-specific platforms. Data within the lookup table may include previous examples of patient identifiers 148 compared to localized term 128. Data within the lookup table may be received from database 300. Lookup tables may also be used to identify misidentified patient identifiers 152 or localized terms 128 within the user data 108 and/or patient identifiers 148 by matching an input value to an output value by matching the input against a list of valid (or invalid) items in an array. Processor 104 may be configured to "lookup" or input one or more localized terms 128, user data 108, patient identifiers 148, and the like. Whereas the output of the lookup table may comprise one or more identify misidentified patient identifiers 152. Data from the lookup table may be compared to examples of misidentified patient identifiers 152, for instance, and without limitation using string comparisons, numerical comparisons such as subtraction operations, or the like.

With continued reference to FIG. 1, the creation of a dictionary data filter 156 from the localized terms 128 may involve a detailed and systematic process implemented by processor 104. This dictionary data filter may be designed to efficiently manage and reference the identified localized terms 128, ensuring their accurate usage and classification within the system. To create the dictionary data filter 156, processor 104 may collect and aggregate localized terms from user data 108 and other relevant sources. Each term may be carefully analyzed to determine its contextual relevance and specificity. This involves an extensive review of the term's usage within specific geographic, institutional, or professional contexts, leveraging natural language processing techniques to understand subtle nuances and variations in term usage. Once the localized terms are identified and validated, they may be incorporated into a dictionary data filter 156. This structure organizes the terms in a manner that facilitates quick access and retrieval. The dictionary is typically implemented as a hash table or a tree structure, where each localized term is associated with unique keys or identifiers. These keys may be carefully selected based on the properties of the terms to optimize the efficiency of search and retrieval operations. Additionally, each entry in the dictionary data filter 156 may include metadata about the localized terms, such as their definitions, synonyms, usage examples, and relationships to other terms in the dictionary. This metadata may enrich the data structure, allowing for more sophisticated data handling and processing capabilities, such as semantic analysis and contextual interpretation. In an embodiment, the dictionary data filter may be continuously updated and refined as new localized terms 128 are identified or as existing terms evolve within their respective contexts. Processor 104 may ensure that the dictionary remains current and accurate by periodically syncing with updated data sources and by applying machine learning algorithms to adapt to changes in term usage and significance. This dynamic dictionary data filter 156 may enable processor 104 to efficiently manage localized terms 128 and ensure their correct application across various functionalities, such as data indexing, query processing, and data analysis. The structured approach not only improves the system's performance but also enhances the accuracy and reliability of the data it handles, particularly in complex fields like healthcare where precise terminology is crucial.

With continued reference to FIG. 1, processor 104 is configured to modify the plurality of patient identifiers 148 as a function of the one or more misidentified patient identifiers. Modifying the plurality of patient identifiers 148 may include adding or removing terms from the list of patient identifiers. Processor 104 may be specifically designed to manage and refine the list of patient identifiers 148 by addressing inaccuracies, such as misidentified patient identifiers 152 detected within the system. The modification process may be triggered as a function of the identification of one or more misidentified patient identifiers 152. This critical adjustment may involve adding or removing terms from the list to correct any errors in the initial identification process-ensuring that the list reflects only accurate and relevant identifiers. In an embodiment, the modification process may extend beyond mere addition or removal of terms. For example, it may also involve replacing localized terms 128 with their corresponding semantic definitions. This replacement may be useful when localized terms 128 are misclassified as patient identifiers 148 due to their ambiguous or specialized nature. By substituting these terms with their clear semantic definitions, the processor ensures that the patient identifiers are universally understandable and accurately reflect the intended information.

With continued reference to FIG. 1, processor 104 may be configured to generate a plurality of anonymized data 160 as a function of the plurality of patient identifiers 148 and the one or more misidentified patient identifiers 152. As used in the current disclosure, "anonymized data" refers to patient identifiers that have been modified or disguised in a way that makes it impossible or impractical to identify the user, while still retaining its usability for specific purposes. As used in the current disclosure, "anonymized metadata" is metadata with each of the patient identifiers obfuscated. The patient identifiers 148 that are anonymized may not include misidentified patient identifiers 152 that have been previously filtered out. Processor 104 may be configured to anonymize each patient identifier 148 within the metadata 112 and the user data 108 to generate anonymized data 160 and anonymized metadata, respectively. This may include redacting the patient identifiers 148 within the user data 108 and/or metadata 112. Redacting may be done using various methods like blacking out, using placeholders, or applying software tools to mask or replace the sensitive data. In an embodiment, this may involve removing or replacing patient identifiers 148 with pseudonyms and/or generic terms. In an embodiment, any method or procedure for creating anonymized data 160 may be used for creating anonymized metadata. Anonymized data may be the same or substantially similar to anonymized data disclosed in U.S. Non-provisional patent application Ser. No. 18/385,057, filed on Oct. 30, 2023, and titled "APPARATUS AND A METHOD FOR ANONYMIZING USER DATA," and U.S. Non-provisional patent application Ser. No. 18/604,154, filed on Mar. 13, 2024-, and titled "APPARATUS AND A METHOD FOR THE ANONYMIZATION OF USER DATA," both of which are incorporated by reference herein in their entirety.

With continued reference to FIG. 1, anonymized data 160 and/or anonymized metadata may include tokenizing the plurality of patient identifiers 148. As used in the current disclosure, "tokenization" is a process where sensitive data elements are replaced with unique tokens or references. Tokenization may rely on a secure mapping or lookup table that links tokens to original data, but this mapping is kept separate and secure. Tokenization of patient identifier 148 may use alphanumeric codes to replace names, geographic locations, temporal data, and the like. In a non-limiting example, a patient identifier 148 associated with a user's name may be replaced by the alphanumeric code of TKN-9876.

With continued reference to FIG. 1, anonymized data 160 and/or anonymized metadata may be done using an aggregation technique to obfuscate the PII. As used in the current disclosure, an "aggregation technique" is a technique used for anonymizing and summarizing information in a way that conceals individual-level details while still providing valuable insights at a higher level of abstraction. An aggregation technique may involve grouping the data into categories or clusters based on common attributes, such as age, location, or other relevant factors. In a non-limiting example, a patient identifier 148 that indicates the user's age of 34 may be aggregated to provide that the user is between the ages of 30-40. In another embodiment, aggregating the patient identifier 148 may include sorting patients into groups of similarly situated patients. They may be similarly situated by demographic factors, symptoms, diagnosis, prognosis, test results, and the like. The patient identifiers 148 of the group may be aggregated for each category, condition, symptom. Common statistical measures may be implemented to provide greater insights into the aggregated data. This may include averages, counts, percentages, mean, median, mode, or other statical measures. In a non-limiting example, a medical test result for five patients with who share the same condition may be anonymized by providing the average score among the five patients. The process of combining and summarizing data to create statistical or summary information, thus protecting the privacy of individual data subjects. In another non-limiting example, instead of reporting individual cholesterol levels for patients, an obfuscation process might provide the average cholesterol level for a group of patients within a certain age range. Additionally, generating anonymized data 160 and/or anonymized metadata may involve generalizing the patient identifiers 148. Generalization may involve replacing specific data points with more generalized categories or ranges. In a non-limiting example, instead of listing the exact age of a patient, processor 104 might categorize them as "under 18," "18-65," or "65 and older".

With continued reference to FIG. 1, processor 104 may generate anonymized data 160 and/or anonymized metadata using a cryptographic system to encrypt the patient identifiers 148. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=-R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

With continued reference to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, a zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, a "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, processor 104 may generate anonymized data 160 using an anonymization machine-learning model. As used in the current disclosure, an "anonymization machine-learning model" is a machine-learning model that is configured to generate anonymized data 160 and/or anonymized metadata. An anonymization machine-learning model may be consistent with the machine-learning model described below in FIG. 2. Inputs to the anonymization machine-learning model may include user data 108, metadata 112, plurality of patient identifiers 148, contextual data 116, examples of anonymized data 160, examples of anonymized metadata, and the like. Outputs to the anonymization machine-learning model may include anonymized data 160 and/or anonymized metadata tailored to the plurality of patient identifiers 148. Anonymization training data may include a plurality of data entries containing a plurality of inputs that are correlated to a plurality of outputs for training a processor by a machine-learning process. In an embodiment, anonymization training data may include a plurality of plurality of patient identifiers 148 correlated to examples of anonymized data 160. Alternatively, anonymization training data may include a plurality of plurality of patient identifiers 148 correlated to examples of anonymized metadata. Anonymization training data may be received from database. Anonymization training data may contain information about user data 108, metadata 112, plurality of patient identifiers 148, contextual data 116, examples of anonymized data 160, examples of anonymized metadata, and the like. In an embodiment, anonymization training data may be iteratively updated as a function of the input and output results of past anonymization machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 may be configured to structure the plurality of user data as a function of the classification of localized terms 128 to dictionary categories 144. Processor 104 is configured to structure the plurality of user data by leveraging the classification of localized terms 128 into dictionary categories 144. This structuring process involves a systematic approach where the processor first identifies and classifies localized terms within the user data based on their semantic meanings as defined in the dictionary categories. Once these terms are accurately categorized, the processor then utilizes this classification to organize and structure the entire dataset in a way that aligns with the defined semantic framework. This configuration may allow the processor to create a structured representation of user data that is both semantically enriched and logically organized. For instance, in a healthcare setting, localized terms 128 like a specific medical test abbreviations or treatment codes are classified into relevant dictionary categories such as "Diagnostic Procedures" or "Therapeutic Interventions." After these terms are categorized, the processor structures the user data by grouping related data points together, enhancing the coherence of the data presentation. This might involve creating sub-sections within the dataset for different types of medical data, each labeled and organized according to the dictionary categories to which the localized terms have been assigned. By doing so, the processor facilitates easier access and retrieval of information, enhances data interpretability, and supports more efficient data analysis. For example, researchers or healthcare professionals can quickly locate all data related to specific treatments or diagnoses, as the structured data format intuitively segments and categorizes information based on the standardized dictionary categories. This systematic structuring as a function of the classification not only improves the usability of the data but also aids in maintaining consistency across various datasets, which is particularly crucial in environments where standardized communication and documentation are essential.

With continued reference to FIG. 1, processor 104 may be configured to generate the structured user data using an indexing system. As used in the current disclosure, an "indexing system" is a structured and organized approach to categorizing, cataloging, and managing information or resources for efficient retrieval and reference. Processor 104, as detailed in the description, utilizes an indexing system to efficiently generate and manage structured user data. This indexing system is instrumental in organizing vast amounts of user data into a structured, easily navigable format, facilitating both quick access and efficient information retrieval. The indexing system operates by categorizing and cataloging the data based on a variety of criteria and attributes associated with the user data. The indexing system may be used to classify and organize user data into meaningful categories, topics, or classes, creating a structured hierarchy that enhances the manageability and accessibility of the data. For instance, in a healthcare setting, the indexing system might organize patient records by diagnosis, treatment types, patient demographics, or dates of service. This structured organization is underpinned by key attributes, metadata, or descriptors such as semantic meaning, titles, keywords, authors, and dates, which are integral to defining and categorizing the content effectively. Furthermore, the indexing system may assign keywords or terms to different items within the data, acting as markers or access points that enable users to perform targeted searches. These keywords represent the content or characteristics of the data items, streamlining the search process by allowing users to locate information based on these specific terms. For example, a healthcare professional could quickly find all patient records related to a specific medical condition like "Type 2 Diabetes" by searching for this keyword.

With continued reference to FIG. 1, processor 104 may be configured to place the structured user data through a data cleansing process. As used in the current disclosure, a "data cleansing process" is a series of steps undertaken to ensure that a dataset is accurate, consistent, and free of errors or anomalies. This process may be used in data management and analysis, as it directly impacts the reliability and validity of the outcomes derived from the data. The objective of a data cleansing process may include identifying and correcting inaccuracies, removing duplicates, standardizing data formats, filling in missing values, and resolving inconsistencies. Processor 104 may audit structured user data to identify any inconsistencies, errors, duplicates, and missing values through both statistical and manual reviews. This audit may set the stage for the removal of inaccuracies, where incorrect information, such as inaccurate or duplicate localized terms 128, may be corrected by cross-referencing authoritative databases or internal documents. This may also include the removal of duplicated data points, eliminating redundant entries that could distort analysis or decision-making processes. A data cleansing process my include a normalizing the structured user data. Normalization may include standardizing data formats across the dataset to ensure uniformity. This normalization may include replacing localized term 128 with their semantic meaning within the structured user data. This may be done so that medical practitioners can understand the meaning of the localized terms 128 without additional translation steps. Addressing missing values may be another key step, where gaps in the data are filled either by estimating values based on existing data, sourcing missing information from external databases, or flagging them for further review.

With continued reference to FIG. 1, processor 104 is configured to store the structured user data in an index structure. As used in the current disclosure, an "index structure" is a data structure or mechanism used to optimize and accelerate the retrieval of specific information or records from a dataset. An index structure may be used to store and organize data a plurality of data points associated with the structured user data. An index structure may organize data points of structured user data by creating a systematic and searchable framework that enhances the efficiency and speed of data retrieval. When applied to structured user data, the index structure may categorize and sort data points based on key attributes or fields, such as timestamps, numerical values, or specific characteristics. This categorization typically involves mapping each data point to an index key, which is then stored in a structured format like a single column index, unique index, hash index, bitmap index, B-tree, hash table, and/or bitmap index. These structures may enable quick lookups, as they reduce the need to scan through the entire dataset to find a particular piece of information. Instead, the index directs the query to the precise location where the relevant data is stored. This organization is especially beneficial in large datasets, where it significantly cuts down on search time and improves overall data handling efficiency. In a non-limiting example, a B-tree index may organize data in a balanced tree structure, allowing for efficient retrieval, insertion, and deletion of data points. Alternatively, a hash table may use a hash function to map keys to specific positions in a table, facilitating rapid data access through direct indexing. Similarly, an inverted index may list all the occurrences of each word or keyword set within a document or a set of documents, enabling quick full-text searches. By organizing data points in such structured ways, index structures 156 may significantly reduce the time complexity of search operations, making data retrieval in large databases and search engines both fast and efficient. By efficiently indexing raw data, the system ensures that even as the volume of data scales up, the time taken to access any specific piece of data remains relatively constant and manageable. In an embodiment, an index structure may include one or more spread sheets.

With continued reference to FIG. 1, a spreadsheet may serve as an index structure. A spreadsheet may organize and store data in a manner that facilitates quick and efficient data retrieval. By arranging data in rows and columns, a spreadsheet may allow for the systematic categorization and sorting of data points. This organization enables users to locate and access specific pieces of information rapidly, using key attributes or fields, such as timestamps, numerical values, or specific characteristics, as indexing criteria. In an embodiment, a spreadsheet may be sorted or filtered based on column values, allowing for a form of single column indexing. Additionally, formulas or conditional formatting in spreadsheets can serve functions similar to those of unique indexes or hash indexes, enabling quick identification and access to unique data points or the application of specific rules for data retrieval.

With continued reference to FIG. 1, the indexing system may be configured to dynamically adjust the index structure in response to additional structured user data. This may be done by implementing adaptive indexing strategies. This dynamic adjustment may be done to ensure that the index remains efficient and effective as the dataset grows and evolves. The indexing system may be configured to continuously monitor the dataset for new structured user data or user data 108. This may include tracking changes in the dataset's characteristics, size, distribution, and the like. As new data points are added to the structured user data, processor 104 may define thresholds or triggers that indicate when it is time to update the index structure. These thresholds can be based on factors like data volume, query performance, changes in data patterns, and the like. Processor 104 may additionally implement auto-scaling mechanisms that automatically adjust the index structure as needed. This may involve increasing the index size, adding new index entries, or reorganizing the index hierarchy. In an embodiment, if the dataset becomes too large to manage efficiently, the indexing system may dynamically partition of the index structure. Partitioning the index structure may include splitting the index structure into smaller partitions or shards, each handling a subset of the data. This allows for parallel processing and faster query performance. In some cases, the indexing system may be configured to analyze the distribution of data and adapt the index structure to optimize data retrieval. For example, if certain data values are heavily skewed, you may create specialized indexes or partitions for those values. The dynamic adjustment of the index structure may be implemented using adaptive indexing algorithms that can modify the index structure on-the-fly.

Still referring to FIG. 1, processor 104 may be configured to display the index structure 156 using a display device 164. As used in the current disclosure, a "display device" is a device that is used to display a plurality of data and other digital content. Processor 104 may be configured to generate a display data structure, wherein the display data structure may be configured to cause a display device to display the target report or other data mentioned herein. A display device 164 may include a user interface. A "user interface," as used herein, is a means by which a user and a computer system interact, for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pulldown menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
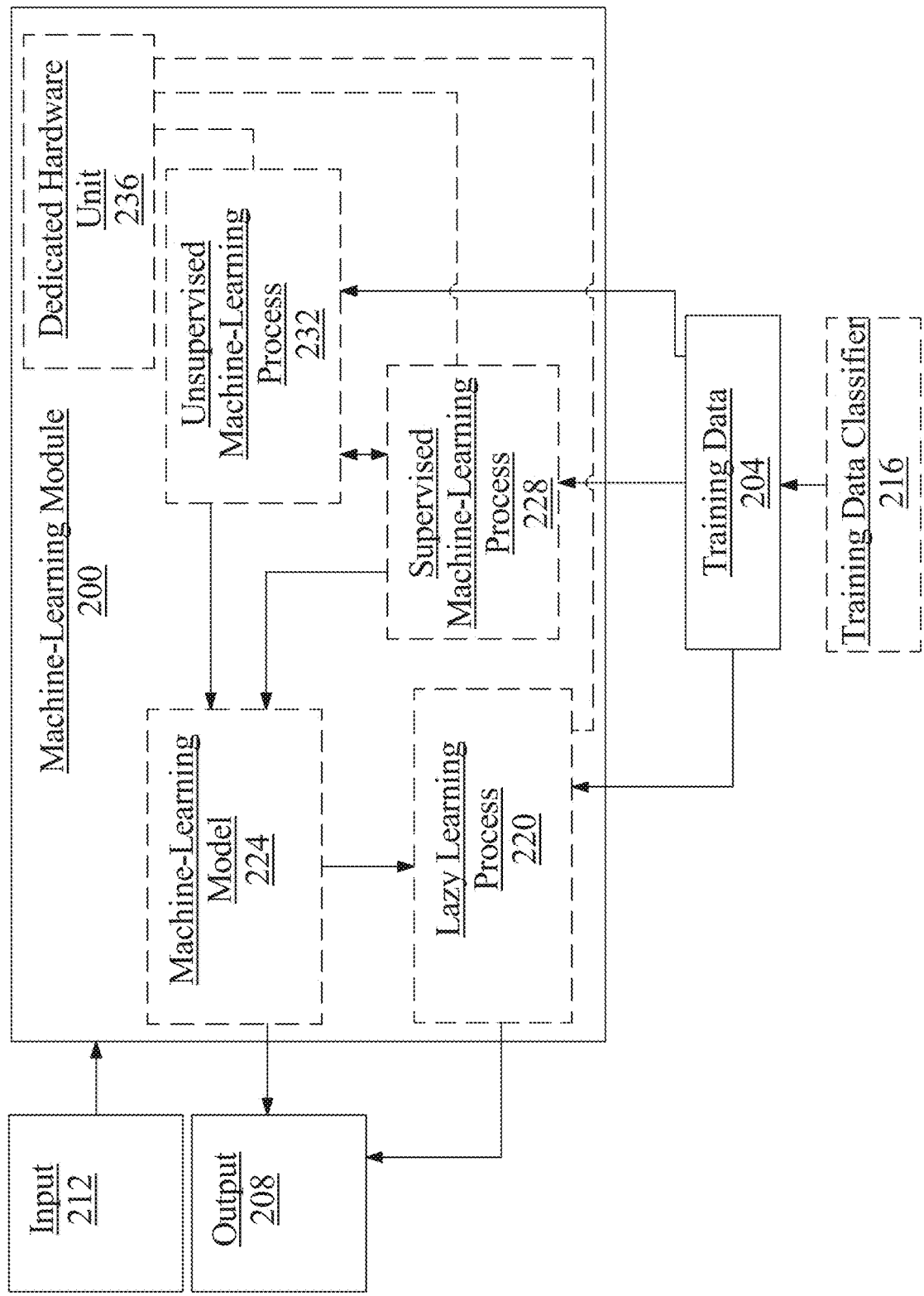
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative examples of localized data 128 correlated to dictionary categories 144.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data into categories associated with slang terms, abbreviations, or other localized medical jargon.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include localized terms 128 as described above as inputs, dictionary categories associated with the semantic definition as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
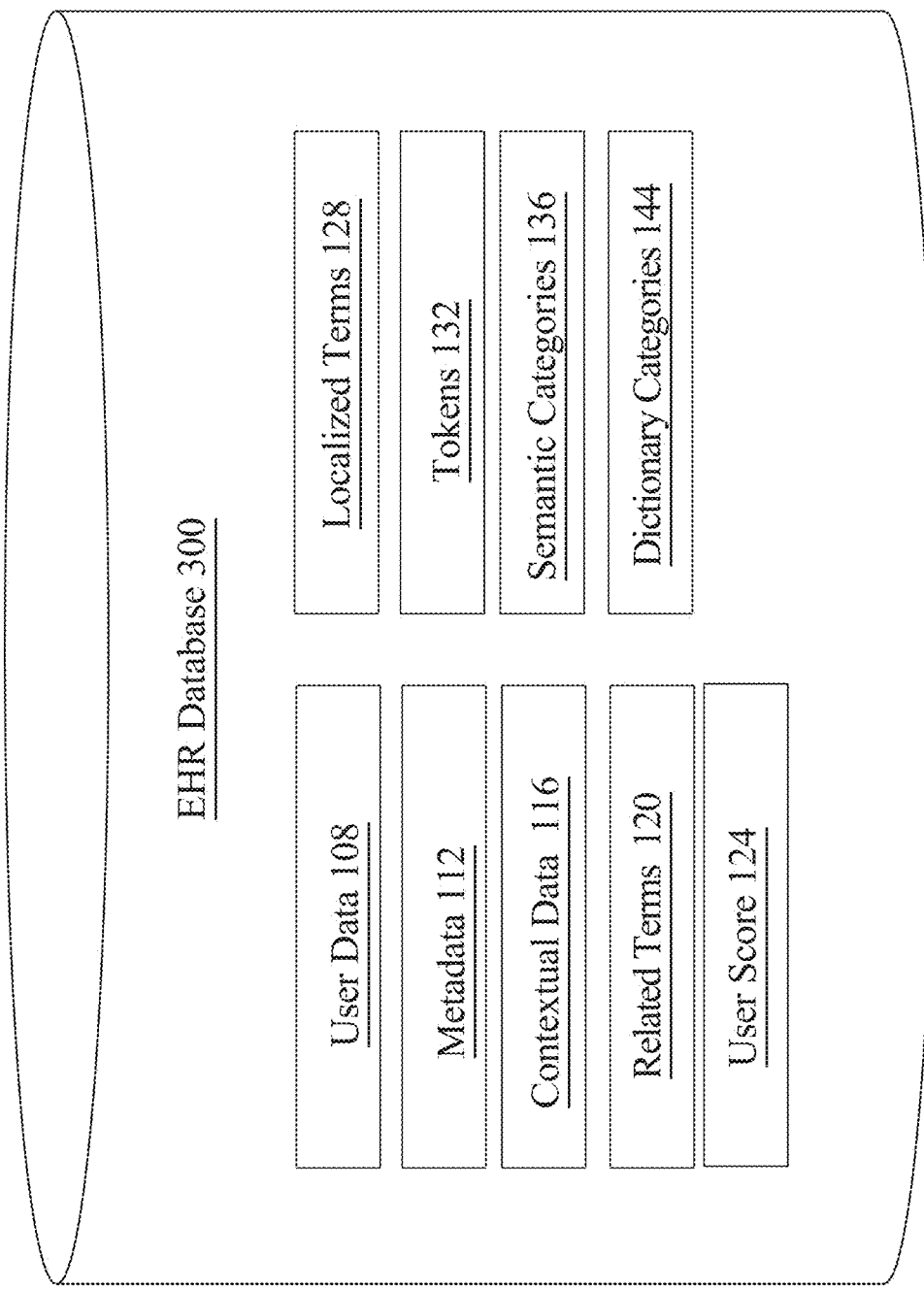
FIG. 3 is a block diagram of an exemplary embodiment of a EHR database.

Now referring to FIG. 3, an exemplary EHR database 300 is illustrated by way of block diagram. In an embodiment, any past or present versions of any data disclosed herein may be stored within the EHR database 300 including but not limited to: user data 108, metadata 112, contextual data 116, related terms 120, localized terms 128, dictionary categories 144, semantic categories 136 and the like. Processor 104 may be communicatively connected with EHR database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. EHR database 300 may be implemented, without limitation, as a relational database, a key-value retrieval database such as a NOSQL database, or any other format or structure for use as a database that a person skilled in the art would recognize as suitable upon review of the entirety of this disclosure. EHR database 300 may alternatively or additionally be implemented using a distributed data storage protocol and/or data structure, such as a distributed hash table or the like. EHR database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
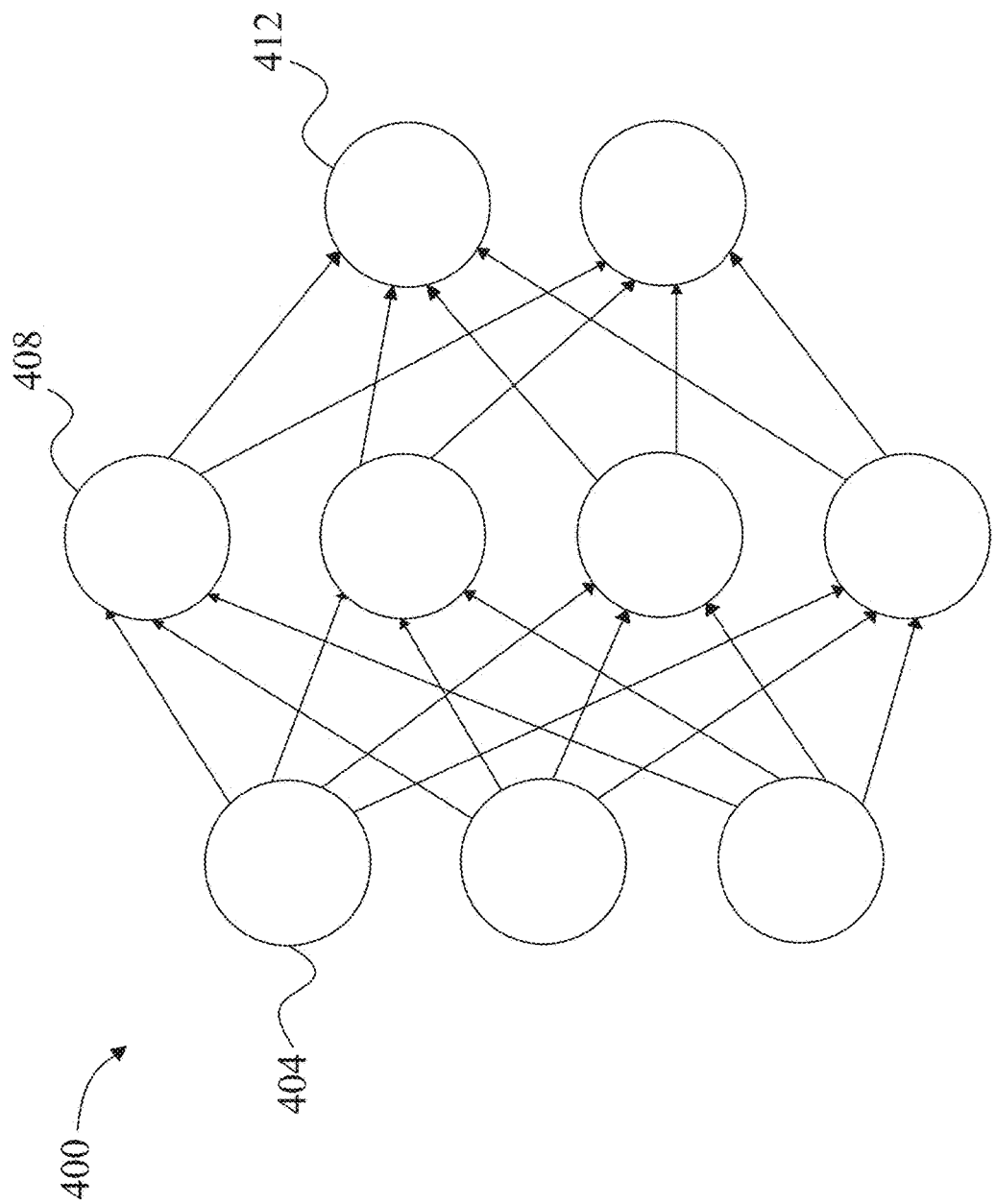
FIG. 4 is a diagram of an exemplary embodiment of a neural network.

Referring now to FIG. 4, an exemplary embodiment of neural network 400 is illustrated. A neural network 400, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
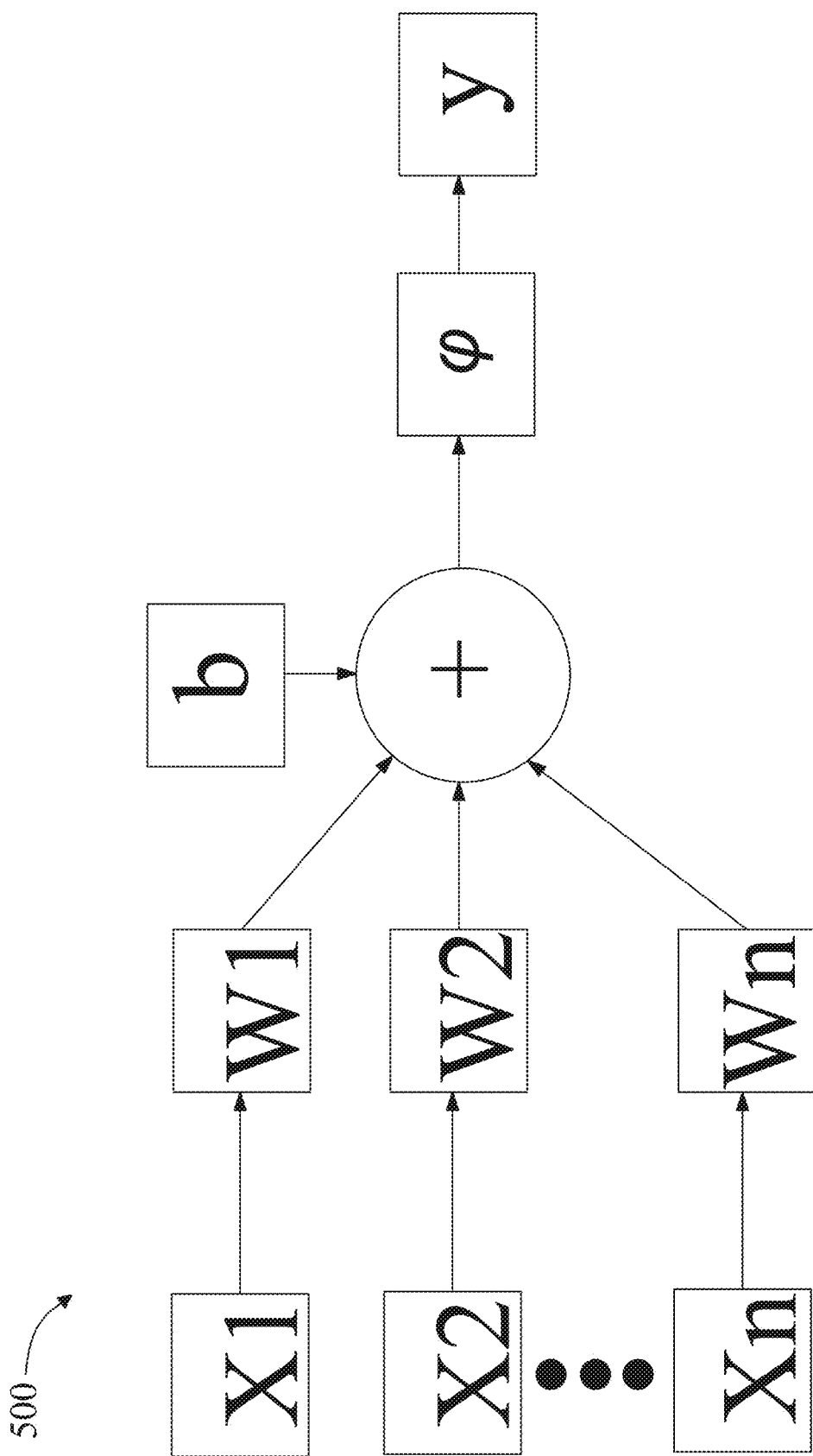
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
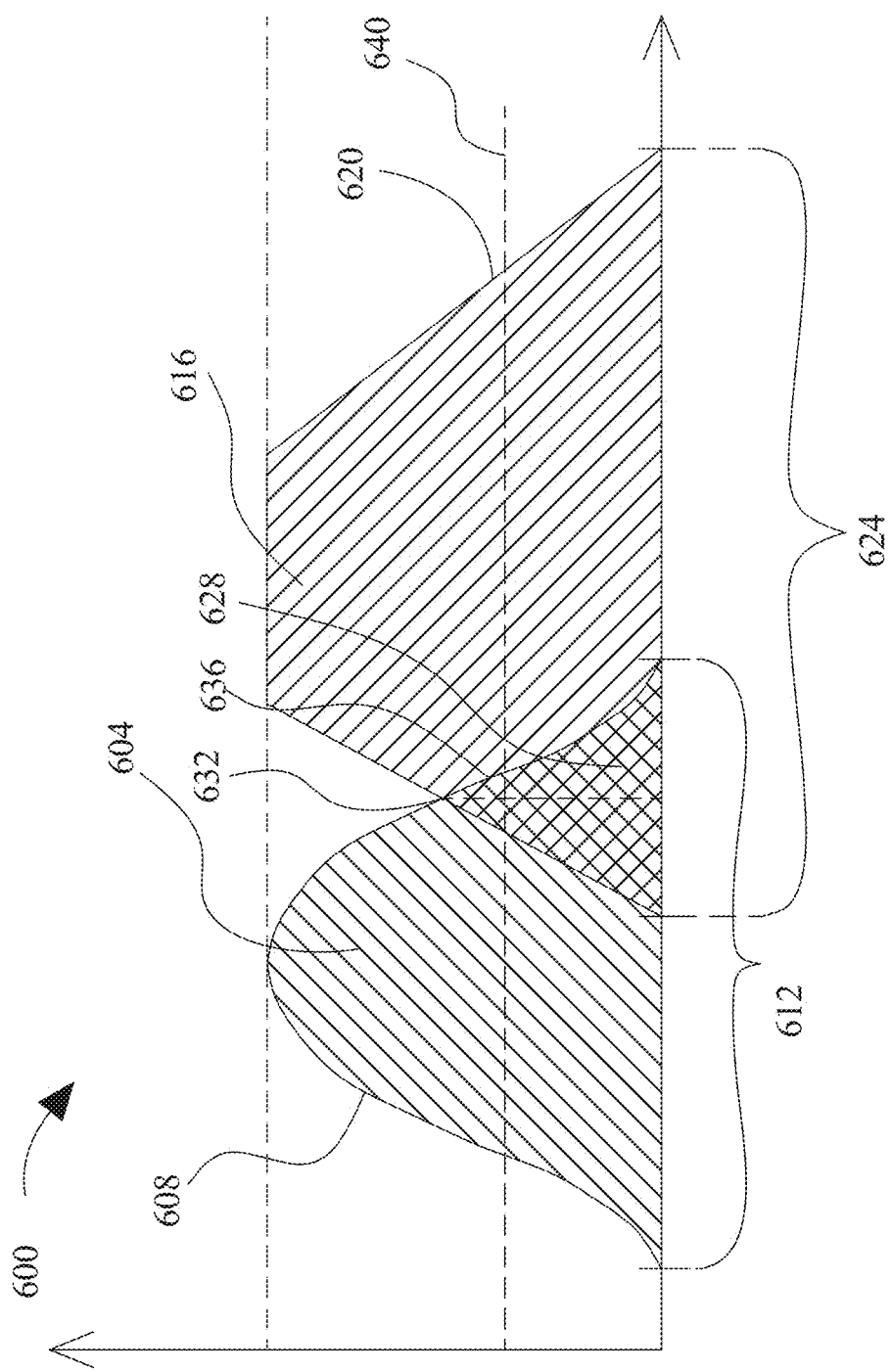
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a localized terms 128 and a dictionary categories 144 from FIG. 1.

Alternatively or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input localized terms 128 and dictionary categories 144. For instance, an acceptance variable may represent a first measurable value pertaining to the classification of localized terms 128 to dictionary categories 144. Continuing the example, an output variable may represent a semantic definition of the localized term associated with the user. In an embodiment, localized terms 128 and/or dictionary categories 144 may be represented by their own fuzzy set. In other embodiments, the classification of the data into a semantic definition of the localized term may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T (a, b)=T (b, a)), monotonicity: (T (a, b)≤ T (c, d) if a≤c and b≤ d), (associativity: T (a, T (b, c))=T (T (a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥ (a, b)=⊥ (b, a), monotonicity: ⊥ (a, b)≤⊥ (c, d) if a≤ c and b≤ d, associativity: ⊥ (a, ⊥ (b, c))=⊥ (⊥ (a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any localized terms 128 and dictionary categories 144. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, the classification into one or more query categories may indicate a sufficient degree of overlap with fuzzy set representing localized terms 128 and dictionary categories 144 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both localized terms 128 and dictionary categories 144 have fuzzy sets, a semantic definition of the localized term may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
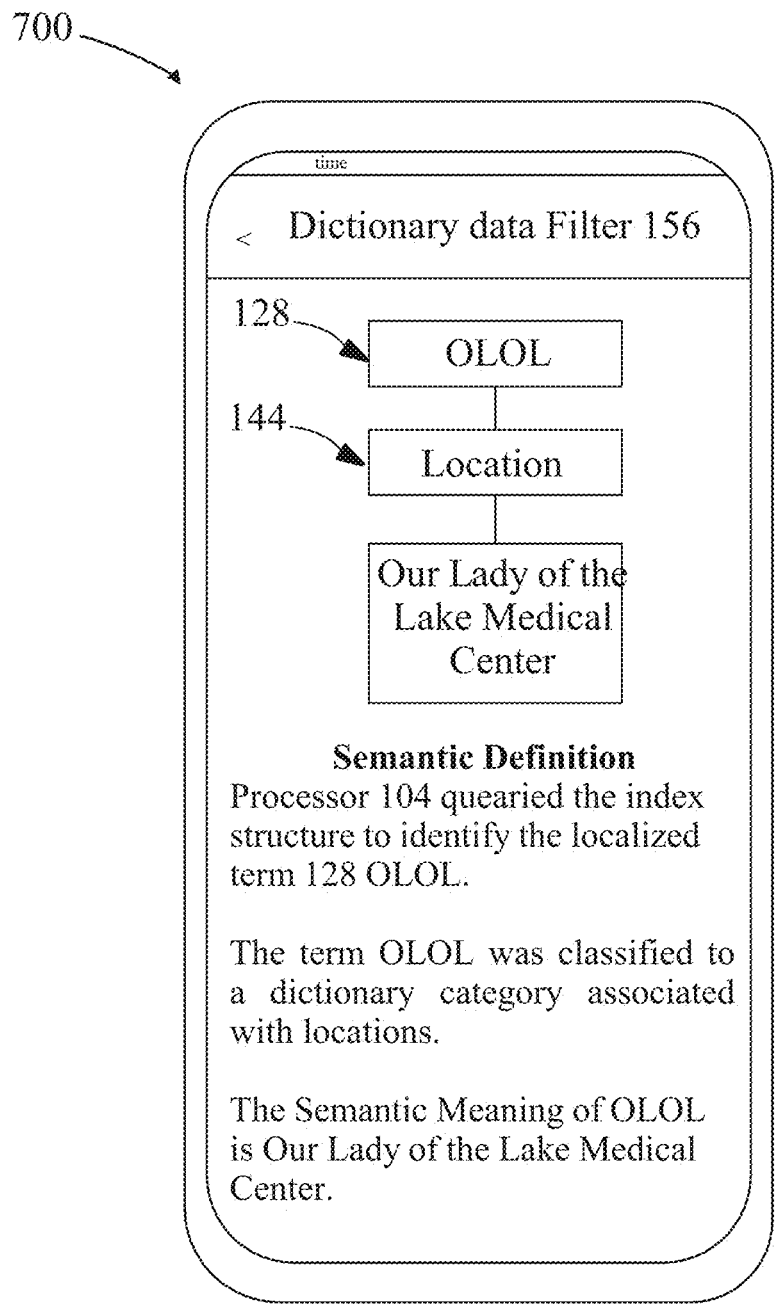
FIG. 7 is an illustration of an exemplary user interface.

Referring now to FIG. 7, is an illustration of an exemplary user interface 700. User interface 700 may be configured to display the output of a dictionary data filter 156. A dictionary data filter may be a sophisticated data structure that optimizes and speeds up the retrieval of specific information from a dataset. It may accomplish this this by organizing data points of the structured user data into a systematic and searchable framework. Each data point is categorized and sorted based on key attributes such as timestamps, numerical values, or specific characteristics, and is mapped to an index key. This key is then stored in a structured format, which could include various types of indexes such as a single column index, unique index, hash index, bitmap index, B-tree, or hash table. In an embodiment, processor 104 may leverage the capabilities of the dictionary data filter 156 to enhance the accuracy and utility of the patient identifiers 148. A dictionary data filter 156 may be configured to remove or modify any localized terms that are present in the user data 108 or patient identifiers 148. If a localized term is found in the dictionary data filter 156, this indicates that the term's semantic meaning has been previously determined and cataloged. The processor 104 may then utilize this information to replace the localized term 128 in the user data with its corresponding semantic meaning. This replacement process not only clarifies the text by substituting vague or specialized terms with their broader, commonly understood meanings but also helps maintain consistency across different documents or datasets where the same terms might be used differently.

Figure 8:
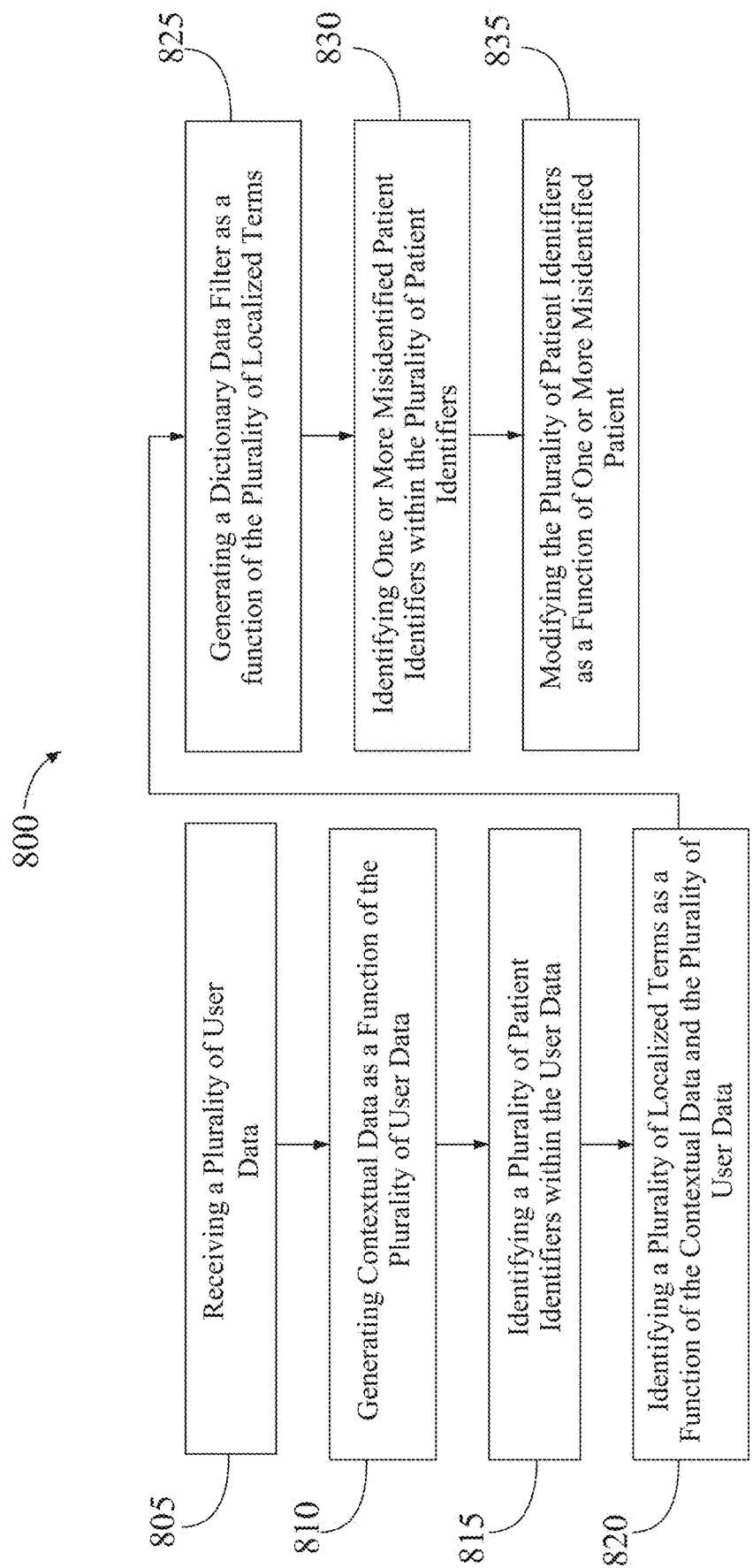
FIG. 8 is a flow diagram of an exemplary method for generating a dictionary data filter for data deidentification.

Referring now to FIG. 8, a flow diagram of an exemplary method 800 for generating a dictionary data filter for data deidentification is illustrated. At step 805, method 800 includes receiving, using at least a processor, a plurality of user data. This may be implemented as described and with reference to FIGS. 1-7. In some cases, receiving the plurality of user data may include receiving the plurality of user data from an electronic health record (EHR).

Still referring to FIG. 8, at step 810, method 800 includes generating, using the at least a processor, contextual data as a function of the plurality of user data. This may be implemented as described and with reference to FIGS. 1-7. In an embodiment, generating the contextual data further comprises identifying a plurality of related terms as a function of the plurality of user data. In some cases, identifying the plurality of localized terms may also include identifying the plurality of localized terms as a function their proximity to at least one related term of the plurality of related terms.

Still referring to FIG. 8, at step 815, method 800 includes identifying, using the at least a processor, a plurality of patient identifiers within the plurality of user data. This may be implemented as described and with reference to FIGS. 1-7. In an embodiment, the method may include generating, using the at least a processor, anonymized data as a function of the plurality of patient identifiers.

Still referring to FIG. 8, at step 820, method 800 includes identifying, using the at least a processor, a plurality of localized terms as a function of the contextual data and the plurality of user data. This may be implemented as described and with reference to FIGS. 1-7. In an embodiment, identifying the plurality of localized terms may include generating a plurality of tokens associated with the plurality of user data. Identifying the plurality of localized terms may further include classifying each token of the plurality of tokens into at least one semantic category and identifying the plurality of localized terms as a function of the classification. In some cases, the at least one semantic category comprises a first semantic category associated with tokens with a known semantic meaning and a second semantic category associated with tokens with an unknown semantic meaning. In an embodiment, identifying the plurality of localized terms may include training a dictionary classifier using dictionary training data, wherein dictionary training data comprises examples of contextual data correlated to examples of localized terms and identifying the plurality of localized terms within the plurality of user data as a function of the contextual data using the trained dictionary classifier. The dictionary classifier may be an LLM.

Still referring to FIG. 8, at step 825, method 800 includes generating, using the at least a processor, a dictionary data filter as a function of the plurality of localized terms. This may be implemented as described and with reference to FIGS. 1-7. In an embodiment, the dictionary data filter may include a lookup table.

Still referring to FIG. 8, at step 830, method 800 includes identifying, using the at least a processor, one or more misidentified patient identifiers within the plurality of patient identifiers using the dictionary data filter. This may be implemented as described and with reference to FIGS. 1-7.

Still referring to FIG. 8, at step 835, method 800 includes modifying, using the at least a processor, the plurality of patient identifiers as a function of the one or more misidentified patient identifiers. This may be implemented as described and with reference to FIGS. 1-7.

With continued reference to FIG. 8, The method may include structuring the plurality of user data using an indexing system and storing, using the at least a processor, the structured user data in an index structure, wherein the indexing system is configured to iteratively modify the index structure in response to receiving additional user data.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
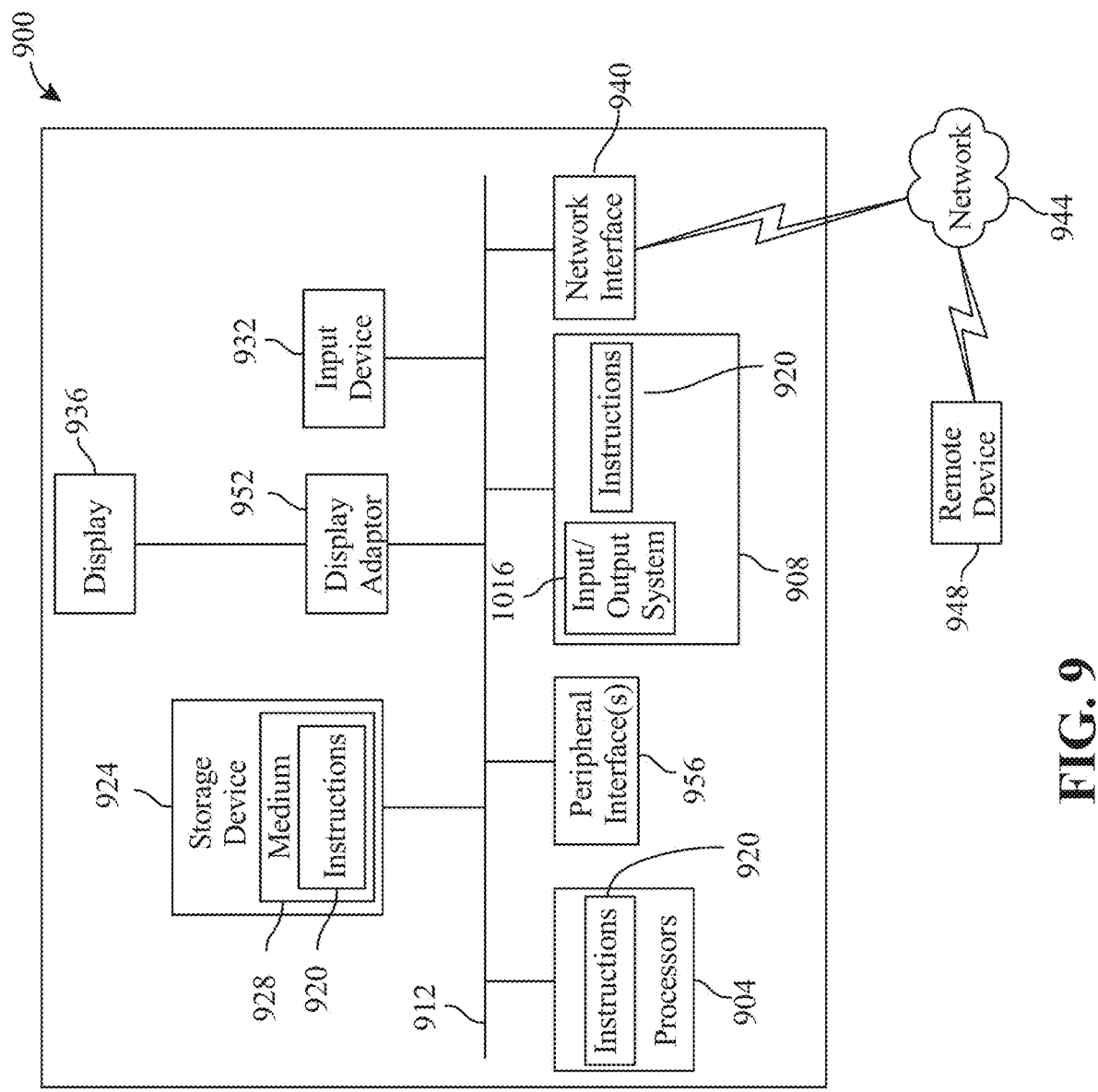
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for generating a dictionary data filter for data deidentification, wherein the apparatus comprises:
   at least a processor; and
   a memory communicatively connected to the at least a processor, wherein the memory contains instructions configuring the at least a processor to:
      receive a plurality of user data;
      generate contextual data as a function of the plurality of user data;
      identify a plurality of patient identifiers within the plurality of user data;
      identify a plurality of localized terms within the plurality of user data as a function of the contextual data;
      generate a dictionary data filter as a function of the plurality of localized terms;
      identify one or more misidentified patient identifiers within the plurality of patient identifiers using the dictionary data filter; and
      modify the plurality of patient identifiers as a function of the one or more misidentified patient identifiers.

2. The apparatus of claim 1, wherein identifying the plurality of localized terms further comprises:
   generating a plurality of tokens associated with the plurality of user data;
   classifying each token of the plurality of tokens into at least one semantic category using a dictionary classifier; and
   identifying the plurality of localized terms as a function of the classification.

3. The apparatus of claim 1, wherein generating the contextual data further comprises identifying a plurality of related terms as a function of the plurality of user data.

4. The apparatus of claim 3, wherein identifying the plurality of localized terms further comprises identifying the plurality of localized terms as a function their proximity to at least one related term of the plurality of related terms.

5. The apparatus of claim 1, wherein the memory further instructs the processor to:
   structure the plurality of user data as a function of the modified patient identifiers using an indexing system; and
   store the structured user data in an index structure, wherein the indexing system is configured to iteratively modify the index structure in response to receiving additional user data.

6. The apparatus of claim 1, wherein receiving the plurality of user data comprises receiving the plurality of user data from an electronic health record (EHR).

7. The apparatus of claim 1, wherein memory further instructs the processor to generate anonymized data as a function of the plurality of patient identifiers.

8. The apparatus of claim 1, wherein the dictionary data filter comprises a lookup table.

9. The apparatus of claim 1, wherein identifying the plurality of localized terms comprises:

training a dictionary classifier using dictionary training data, wherein dictionary training data comprises examples of contextual data correlated to examples of localized terms; and identifying the plurality of localized terms within the plurality of user data as a function of the contextual data using the trained dictionary classifier.

10. The apparatus of claim 9, wherein the dictionary classifier comprises a large language model.

11. A method for generating a dictionary data filter for data deidentification, wherein the method comprises:
receiving, using at least a processor, a plurality of user data;
generating, using the at least a processor, contextual data as a function of the plurality of user data;
identifying, using the at least a processor, a plurality of patient identifiers within the plurality of user data;
identifying, using the at least a processor, a plurality of localized terms within the plurality of user data as a function of the contextual data;
generating, using the at least a processor, a dictionary data filter as a function of the plurality of localized terms;
identifying, using the at least a processor, one or more misidentified patient identifiers within the plurality of patient identifiers using the dictionary data filter; and
modifying, using the at least a processor, the plurality of patient identifiers as a function of the one or more misidentified patient identifiers.

12. The method of claim 11, wherein identifying the plurality of localized terms further comprises:
generating a plurality of tokens associated with the plurality of user data;
classifying each token of the plurality of tokens into at least one semantic category using a dictionary classifier; and
identifying the plurality of localized terms as a function of the classification.

13. The method of claim 11, wherein generating the contextual data further comprises identifying a plurality of related terms as a function of the plurality of user data.

14. The method of claim 13, wherein identifying the plurality of localized terms further comprises identifying the plurality of localized terms as a function their proximity to at least one related term of the plurality of related terms.

15. The method of claim 11, wherein the method further comprises:
structuring, using the at least a processor, the plurality of user data as a function of the modified patient identifiers using an indexing system; and
storing, using the at least a processor, the structured user data in an index structure, wherein the indexing system is configured to iteratively modify the index structure in response to receiving additional user data.

16. The method of claim 11, wherein receiving the plurality of user data comprises receiving the plurality of user data from an electronic health record (EHR).

17. The method of claim 11, wherein the method further comprises generating, using the at least a processor, anonymized data as a function of the plurality of patient identifiers.

18. The method of claim 11, wherein the dictionary data filter comprises a lookup table.

19. The method of claim 11, wherein identifying the plurality of localized terms comprises:
training a dictionary classifier using dictionary training data, wherein dictionary training data comprises examples of contextual data correlated to examples of localized terms; and
identifying the plurality of localized terms within the plurality of user data as a function of the contextual data using the trained dictionary classifier.

20. The method of claim 19, wherein the dictionary classifier comprises a large language model.

* * * * *